(12) United States Patent
Nishihara

(10) Patent No.: US 8,069,297 B2
(45) Date of Patent: Nov. 29, 2011

(54) STORAGE DEVICE, COMPUTER SYSTEM, AND STORAGE DEVICE ACCESS METHOD

(75) Inventor: Toshiyuki Nishihara, Kanagawa (JP)

(73) Assignee: Sony Corporation, Tokyo (JP)

( * ) Notice: Subject to any disclaimer, the term of this patent is extended or adjusted under 35 U.S.C. 154(b) by 953 days.

(21) Appl. No.: 11/594,882

(22) Filed: Nov. 9, 2006

(65) Prior Publication Data

US 2007/0124531 A1    May 31, 2007

(30) Foreign Application Priority Data

Nov. 30, 2005 (JP) ............................... P2005-346660
May 15, 2006 (JP) ............................... P2006-135058
Sep. 11, 2006 (JP) ............................... P2006-245687

(51) Int. Cl.
*G06F 12/08* (2006.01)
(52) U.S. Cl. ........................................ 711/103; 711/206
(58) Field of Classification Search .................. 711/103, 711/206
See application file for complete search history.

(56) References Cited

U.S. PATENT DOCUMENTS

| 6,282,624 B1 * | 8/2001 | Kimura et al. ............... 711/202 |
| 2004/0085849 A1 * | 5/2004 | Myoung et al. ............... 365/232 |
| 2006/0087893 A1 * | 4/2006 | Nishihara et al. ........ 365/189.01 |

FOREIGN PATENT DOCUMENTS

| JP | 08-032762 | 2/1996 |
| JP | 2005-1714 | 1/2005 |
| JP | 2005-114711 | 4/2005 |
| JP | 2005-165234 | 6/2005 |

OTHER PUBLICATIONS

Handy, Jim, The Cache Memory Book, 1998, Academic Press, Inc., $2^{nd}$ edition, pp. 5-8, 64-67.*

* cited by examiner

*Primary Examiner* — Jared Rutz
(74) *Attorney, Agent, or Firm* — Rader, Fishman & Grauer PLLC

(57) ABSTRACT

A storage device that includes: an address table; a cache memory; a flash memory device that is a storage medium for user data; and a control circuit that is in charge of access management for the flash memory device. In the storage device, the control circuit makes access to the user data on the flash memory device via an address table, in the address table, with an index of an address value generated from an initial logical address, location information is acquired for the user data on the flash memory device corresponding to the index, and the address table is segmented in its entirety into a plurality of small address tables for every area of the index, and the small address tables that are segmentation results are stored in the flash memory device, read as required when the user data is accessed, and expanded on the cache memory with entries of the small address tables.

4 Claims, 22 Drawing Sheets

PRIOR ART

PRIOR ART

PRIOR ART

PRIOR ART

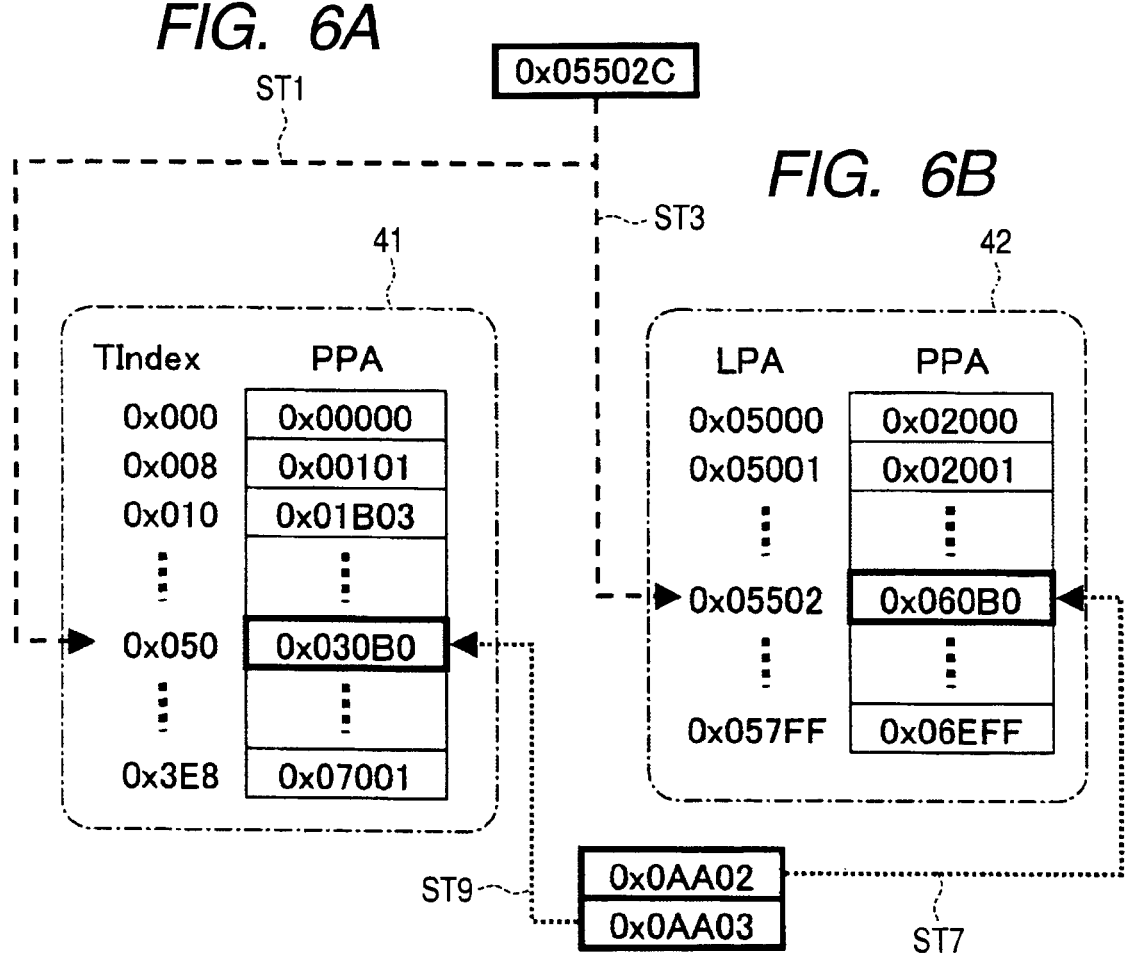
FIG. 6A
FIG. 6B
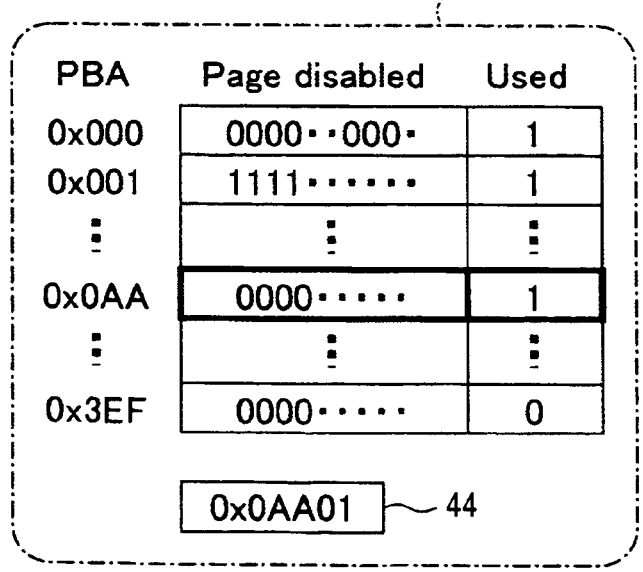
FIG. 6C

FIG. 11
FIG. 11A
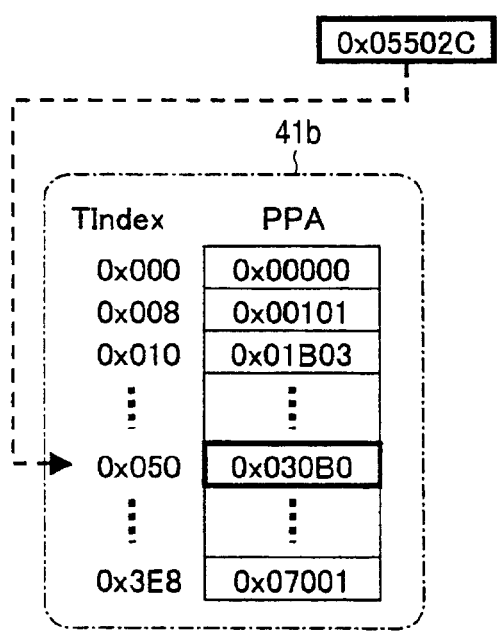
FIG. 11B
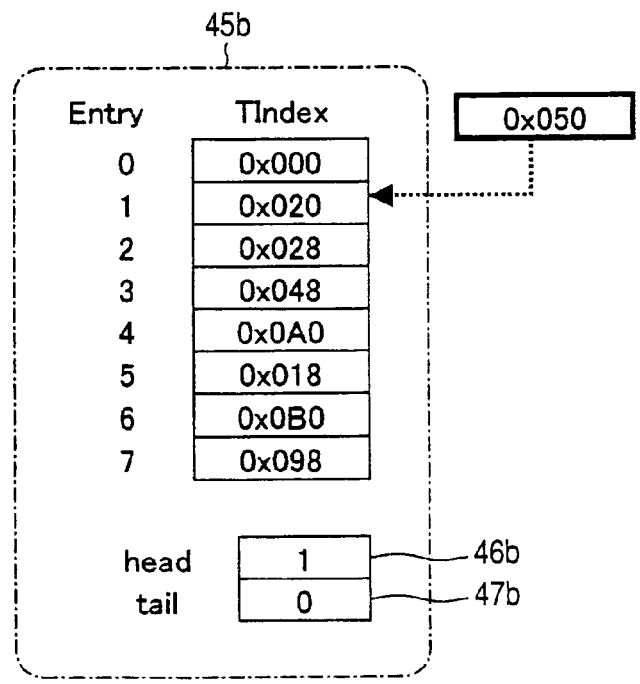

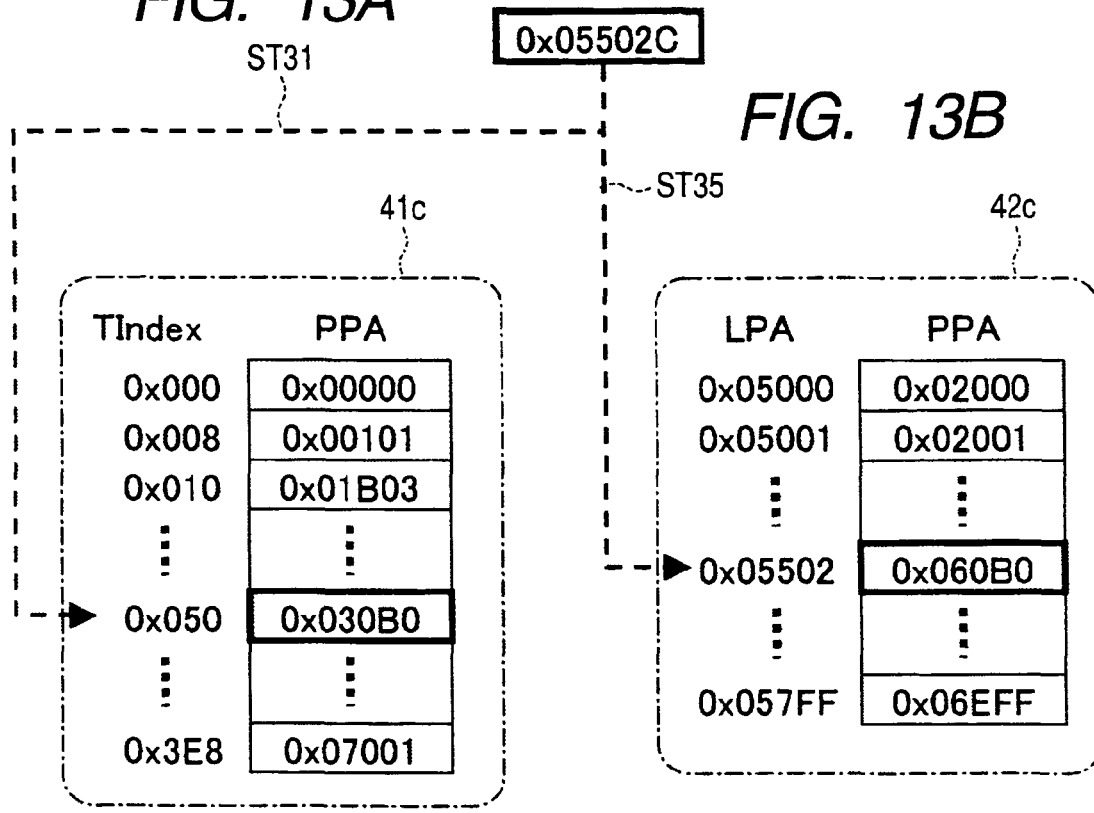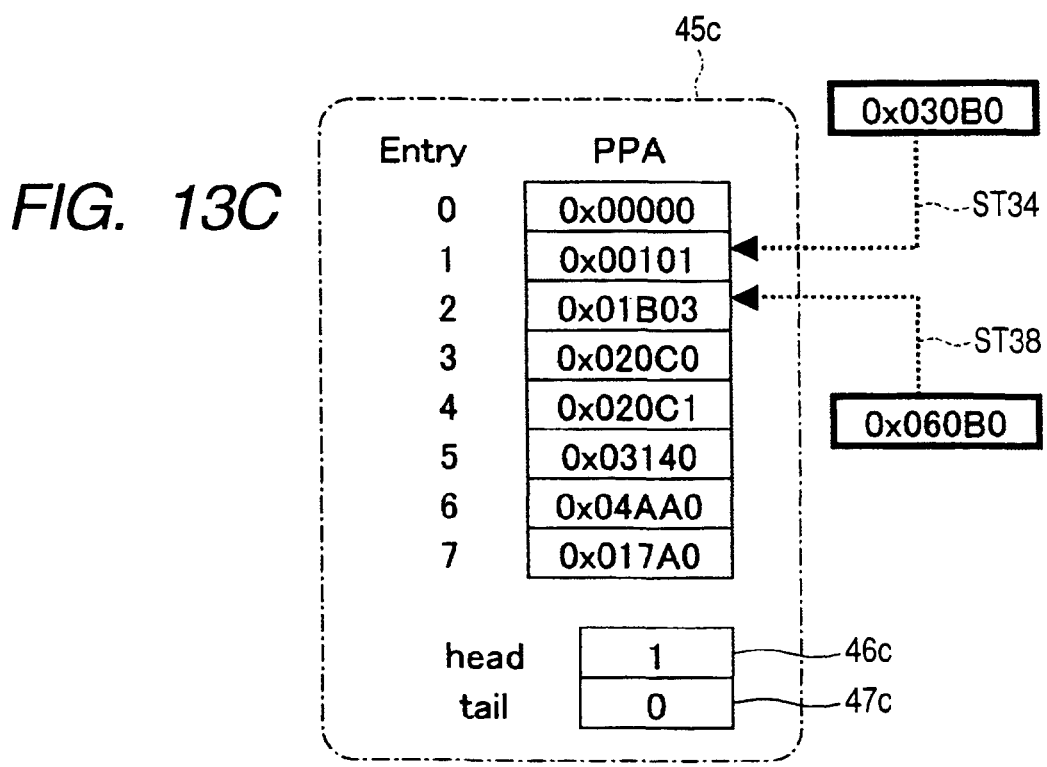

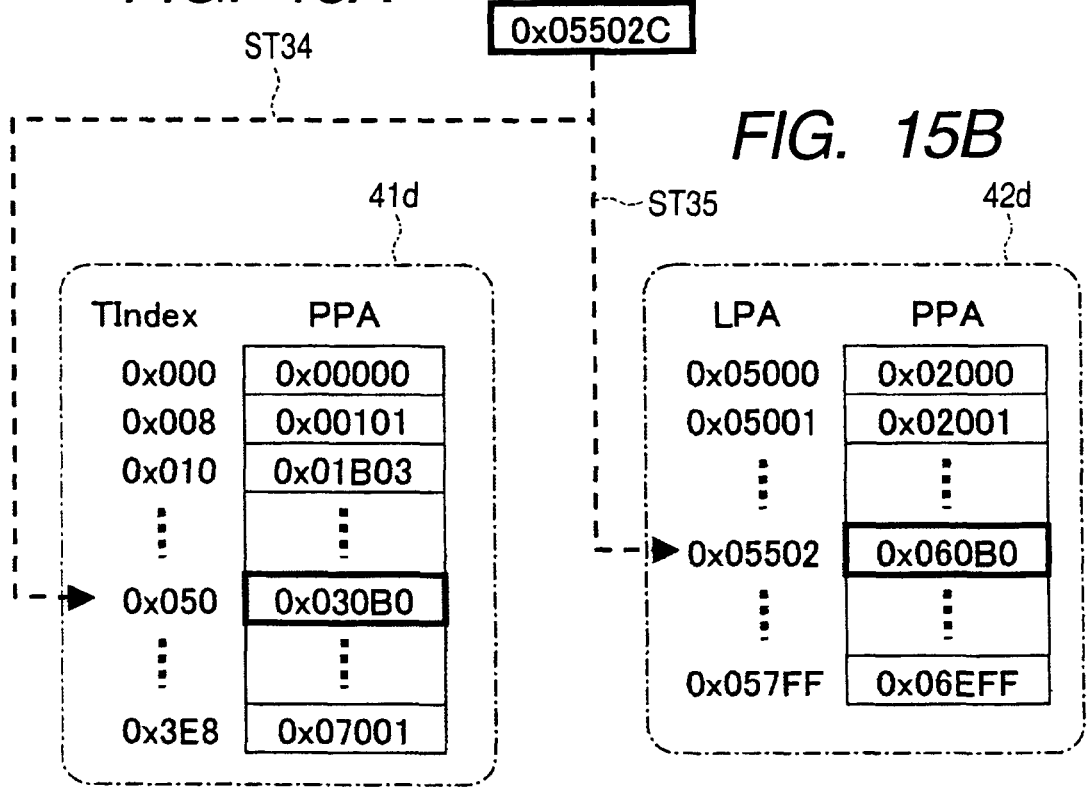
FIG. 15A
FIG. 15B
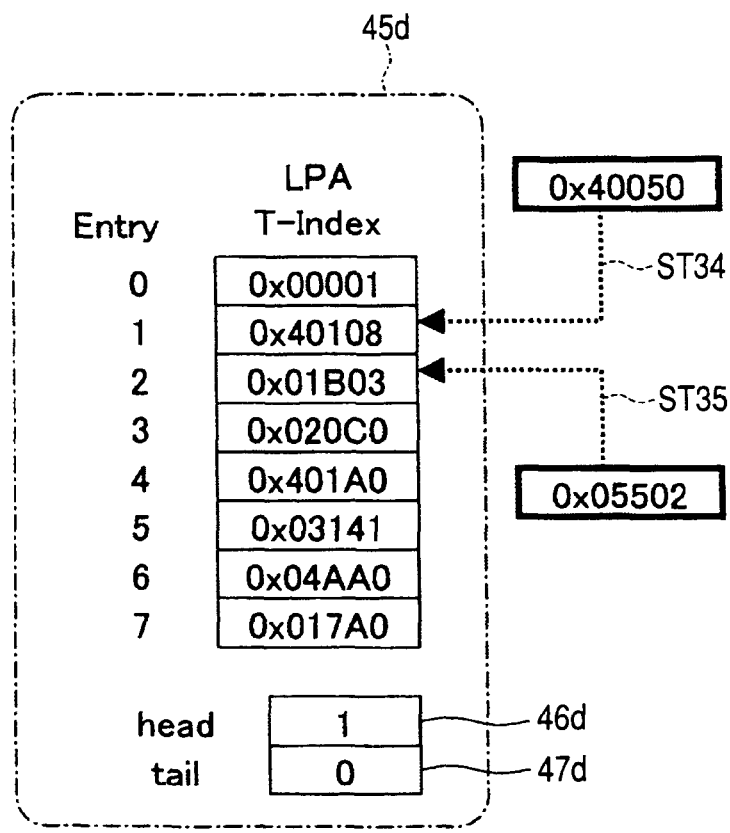
FIG. 15C (EXEMPLARY OPERATION 1: ORDER CHANGE OPERATION BY ADDITION AND DELETION)

(EXEMPLARY OPERATION 2: ORDER CHANGE OPERATION BY SWAPPING)

(EXEMPLARY OPERATION 3: BY STACKING)

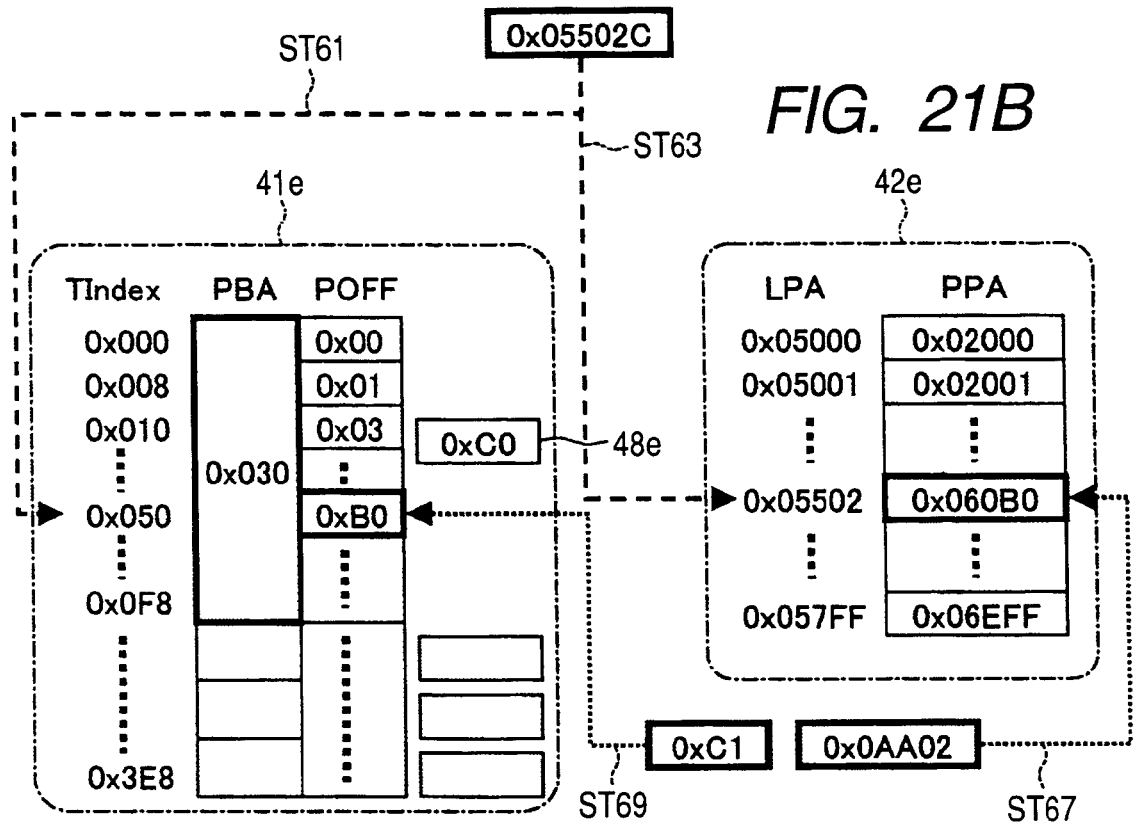

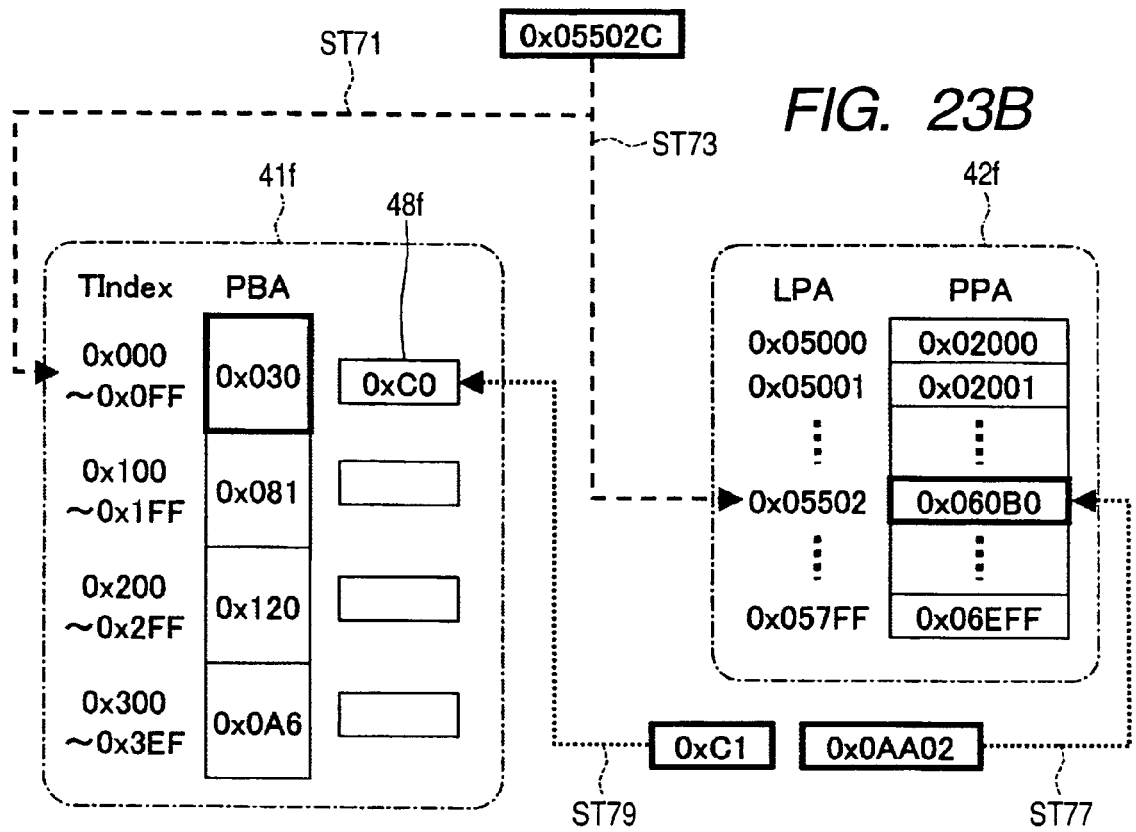
FIG. 23A
FIG. 23B
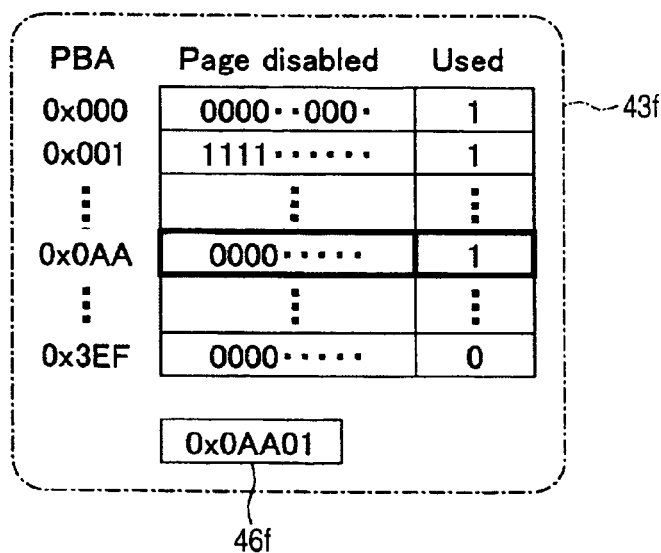
FIG. 23C

STORAGE DEVICE, COMPUTER SYSTEM, AND STORAGE DEVICE ACCESS METHOD

CROSS REFERENCES TO RELATED APPLICATIONS

The present invention contains subject matter related to Japanese Patent Applications JP 2005-346660, JP 2006-135058 and JP 2006-245687 filed in the Japanese Patent Office on Nov. 30, 2005, May 15, 2006 and Sep. 11, 2006, respectively, the entire contents of which are incorporated herein by reference.

BACKGROUND OF THE INVENTION

1. Field of the Invention

The present invention relates to a storage device including a nonvolatile memory and a computer system and, more specifically, to a storage device whose main storage medium is a flash memory, a computer system, and a storage device access method.

2. Description of the Related Art

In recent years, flash memories have been receiving attention as a storage medium for use for digital still cameras or mobile computer equipment.

The flash memory is a semiconductor memory for storing therein data. For data storage, by using electron tunneling or acceleration of hot electrons, electrons are injected to a floating gate or a trapping layer after being made to pass through a gate insulation film so that a threshold value of a cell transistor is changed. In such a semiconductor memory, only one transistor of a multilayer gate or MNOS (Metal Nitride Oxide Semiconductor memory) structure can configure a memory cell so that the resulting memory can be inexpensive and large in capacity.

For such a semiconductor memory, a NAND flash memory is typically exemplified.

FIG. 1 is a diagram showing an exemplary internal configuration of a NAND flash memory.

The NAND flash memory of FIG. 1 includes a plurality of memory units 1-1 to 1-n in an array (in length and width directions). The memory units 1-1 to 1-n are connected to bit lines BL1 to BLn, respectively.

For example, a gate of a selection transistor 2 is connected to a selection gate line SL1, and a gate of another selection transistor 3 is connected to a selection gate line SL2. Gates of memory cells N0 to N15 are connected to word lines WL0 to WL15, respectively.

The memory cells N0 to N15 are each of multilayer gate structure and store therein data in accordance with the amount of charge stored for a floating gate. That is, when many electrons are stored in the floating gate, a transistor is increased in threshold value. For an assessment of data, an access circuit 4 including a sense amplifier or others is used to detect whether there is a current flow from the charged bit lines BL1 to BLn to the memory units 1, i.e., 1-1 to 1-n.

Such a NAND flash memory has no need to include an area for every memory cell to come in contact with the bit lines. In this sense, the NAND flash memory is considered suitable for use as a medium of inexpensive large-capacity storage devices.

The issue here is that the flash memory is generally considerably slow in program speed and requires several hundreds of micro (μ) seconds per cell. With the fact that no overwriting of data is possible, there is a need to erase data before running of a program, and this takes several m seconds. To deal with such a problem, many memory cells are subjected to parallel processing.

That is, writing of a memory cell group 5, i.e., a page unit, including cells all connected to the word line WL0 is performed in a batch all at once, and erasing of a cell block 6 configured by page groups each sharing a memory unit is performed in a batch all at once. Through such batch writing and erasing, the program is increased in transfer speed.

More specifically, Non-patent Document 1 (Digest of ISSCC2002, p 106, session 6.4) describes a NAND flash memory of 1 Gb, in which a page size is 2 kbytes, and an erase block size is 128 kB. That is, in a memory array, a memory cell group of 128 kbytes is erased in parallel, and a memory cell is programmed thereto in parallel for every 2 kbytes, thereby realizing the program transfer speed of 10 MB/s.

Also, in the field of NAND flash memory, the memory takes various internal configurations as a result of memory size reduction and a development of multilevel memory. However, accessing the memory is still the same, i.e., using a unit referred to as page for batch writing/reading and a unit referred to as block or erase block for batch erasing, and the block still includes a plurality of pages.

Alternatively, the memory device may include a plurality of flash memory chips and perform parallel writing by putting the chips into operation all at once. With this being the configuration, a group of pages in each of the chips serves as an actual page in the memory device, and the actual page serves as a unit for batch writing for the memory device. In this configuration, a group of erase blocks corresponding to each of the chips also serves as an actual erase block in the memory device, and the actual erase block serves as a unit for batch erasing in the memory device. As such, also in such a memory device, the actual erase block being a unit for batch erasing is configured to include a plurality of actual pages, each being an individual writing unit.

Moreover, with such varying internal configuration as a result of memory size reduction, and with some change observed in writing mechanisms, constraints are imposed on the pages in the blocks for the order of writing. That is, writing to the pages is made in the forward direction from low-order addresses to high-order addresses, and writing in the backward direction is prohibited. For example, once writing is made to some page, no writing is allowed any more to the page no matter if any low-order address in the same block is not yet through with writing.

Note that the pages for the NAND flash memory each generally have a backup area of 64 bytes with respect to an area for storing therein the user data of 2 kbytes, for example. The backup area can store therein various types of management data, e.g., parity bits, on the side of a system using the NAND flash memory. Writing to such a backup area is generally required to be made in one operation with writing to the user data area so that the writing operation is executed always as a set, i.e., executed both to the backup area and the user data area.

With a general file storage, the minimum write unit is a sector of 512B, which is used as a basis for random access. In this case, a command is issued to rewrite only a part of one page area, for example.

If random access as such is made using the above-described flash memory, however, any actual erase block area has to be entirely erased. If the actual erase block area includes any effective file in its not-yet-selected area, the file has to be protected from being lost.

FIG. 2 shows an example for such a data update. The procedure for the data update is as follows.

1. First of all, data of an entire actual erase block area 21 is read from a flash memory 20 to a buffer memory 23.

2. Next, in the buffer memory 23, any corresponding data is updated.

3. The block area 21 on the flash memory is erased.

4. Lastly, from the buffer memory 23, updated block data is entirely written back to the data-erased area 21.

As such, a sequence of operations for rewriting a few sectors requires a huge overhead of reading and writing of data whose amount is about 100 times as large as the amount of data in the sectors and erase blocks. As a result, it takes a longer time to fully seek a hard disk drive.

For a file update, it is actually common to update, at the same time, not only any corresponding file but also a plurality of small areas related to the file, e.g., a management domain or a log description. There may be a case where a file itself is fragmented and scattered in a plurality of small areas. Therefore, if there are constraints as described above, the actual transfer capability will be considerably poor.

For the aim of increasing the efficiency of such a sequence of operations, more flexible memory management using address conversion has been variously proposed. The current most popular management is of performing address conversion on an erase block basis.

FIGS. 3A and 3B are diagrams both showing an exemplary method of performing address conversion on an erase block basis.

FIG. 3A is a diagram showing a storage area of a flash memory, and FIG. 3B is a diagram showing an address table.

An address table 27 can acquire a physical block address (PBA) with an index of a logical block address (LBA). The physical block address is an address on the flash memory for any corresponding erase block.

When a host or an application issues a command of accessing a block address of "0x55", for example, the address is converted into "0x6B" using the address table, whereby access is made to the erase block 21 of the flash memory 20.

Under such memory management, data is updated on the flash memory as below.

1. A data-erased block 25 is prepared in advance for backup use with a physical address of "0xAA".

2. Assuming that a logical block address "0x55" is addressed, a corresponding physical block address "0x6B" is acquired, and thus a page 22 in the block 21 is accessed. With such access, data of the block 21, i.e., a to-be-erased block, of the flash memory 20 is sequentially copied to the backup block 25 via a page buffer 24, which is separately provided.

3. For copying to-be-updated data of the page 22, any desired portion of the data is updated on the page buffer 24 before being copied to a target page 26.

4. After any available data of the page is completely copied, the address of the block 21 is exchanged to the address of the backup block 25 on the address table 27.

5. Lastly, the original block 21 is erased.

After such a procedure, for the logical block address "0x55", an erase block corresponding to the physical block address "0xAA", i.e., backup block 25, will be always accessed so that accessing remains consistent.

After a data update, the block 25 becomes accessible at the time of the above process 4 so that the time to be taken for block erasing can be saved.

If such a backup block is plurally provided and scattered throughout the storage area, intensive copying to any specific block is prevented. Moreover, address conversion as above serves well for the purpose of preventing access making to any defective block.

Patent Document 1 (JP-A-8-328762) describes the details about a management method for use in a WORM (write-once, read-many-times) system using address conversion on a page basis. The page here is a unit for batch writing of the flash memory.

FIGS. 4A and 4B are diagrams both showing a management method in the WORM system.

FIG. 4A is a diagram showing a storage area of a flash memory, and FIG. 4B is a diagram showing an address table.

With such a management method, a physical page address (PPA) can be acquired from an address table 28 with an index of a logical page address (LPA). The physical page address is an address on the flash memory for the corresponding page.

When a host issues a writing command to a logical page address of "0x5502", for example, address conversion is performed using an address table on a page basis so that a physical page address "0x6B05" on the flash memory is acquired. As such, access is made to any corresponding area of the page 22 in the block 21.

For a data update in page 22, a search is made to find any appropriate free page area for direct data writing in the flash memory. As a writing destination considered appropriate, if a head page area 29 of the data-erased block 25 corresponding to a physical block address of "0xAA", is selected only the data of the page 22 is updated via the page buffer 24, and thus updated data is written to the page area 29. At this time, the logical page address "0x5502" is remapped to a physical address "0xAA00" of the page area 29. The old data on the page 22 is left as it is for the time being but is made invalid.

With such memory management, as long as there is any free area in the flash memory, writing of only one-page data is needed for updating the respective page data.

Thus, this leads to data rewriting at high speed. During the data rewriting, there is no need for data erasing so that the rewriting frequency can be considerably reduced for the flash memory, and the useful life of the flash memory also can be increased.

The inventors of the invention have proposed the more advanced management technique utilizing address conversion on a page basis, e.g., JP-A-2005-114711, JP-A-2005-165234, and JP-A-2005-1714.

There is also the technique utilizing address conversion which is an intermediate version between a page-basis and a block-basis. For example, without changing the relationship between the blocks and the page groups in the blocks, the positional relationship between the pages inside of the blocks is remapped. The effects derived thereby for reduction of the overhead are intermediate in level between the above-described two techniques.

As such, by remapping using an address table, user data on the flash memory can be managed in various different manners.

With every such manner, the address table is referred to by using as an index the address value generated from the initial logical address, and information is acquired about the location of the corresponding user data, e.g., physical address on a flash memory. Based on the thus acquired location information, access is made to the data on the flash memory.

Especially, if every page group that is a unit for batch writing is subjected to remapping of changing their relative positions, the access efficiency can be increased with remarkable effects.

SUMMARY OF THE INVENTION

Utilizing remapping with an address table as above enables the implementation data access with more flexibility and efficiency.

The problem here is that if effective management is an aim, it means that address conversion is required to be performed with a unit smaller in size. With this being the case, the address table is increased in size, thereby occupying a substantial portion of the memory area.

Considered here is a case with a page size of 2 kB and a storage having the capacity of 2 GB. In this case, 1M pieces of page groups are stored. If address conversion is fully performed on a page basis, its addressing requires 20 bits, whereby the size of the address table will be of 20 M bits.

To deal with such a problem, it is considered effective to store an address table in a flash memory and read out only any needed portion onto a RAM (Random Access Memory).

The concern here is that the address table is always updated, and therefore the address table on the flash memory also has to be updated as appropriate. If this is the case, however, there are many constraints for rewriting the flash memory as described above, and if a reading or writing error occurs, there is a need to take measures therefor.

To store an address table to a flash memory, any specific erase block or address area is generally assigned for the purpose, and thus anyone specific physical area is intensively rewritten. This results in the disadvantages of accelerating writing fatigue and shortening the useful life.

What is more, data writing or reading to/from the flash memory is under any specific management, and no swift access as user data is easily achieved. Due to such a difficulty, disadvantageously, many operations are additionally executed, the procedure thus gets complicated, and table exchange takes time.

As described above, the writing fatigue caused by table exchange and the longer time are both serious problems, and frequent table exchange has not been considered. That is, to deal with a large-capacity storage, there has been no choice but to segment the table.

Thus, there are expectations of segmenting the table to a minimum and covering a cluster of successive address areas by a table on the RAM to make general user access remain in the range.

That is, although the RAM on which the address table is expanded is used as a cache memory, the address table has been so far cached in a primitive manner as if simply being a buffer, i.e., the simplest caching only with one entry. These have been used as cache memories only for the table, being independent from the user data.

If the capacity of the RAM is to be reduced while the table is being increased in size, this means that the table is segmented more. Such a simple cache memory often causes cache misses, thereby resulting in a disadvantage of reducing the efficiency.

When such a cache memory is used, the update details about the table in the cache memory are all lost if an instantaneous power interruption occurs. If the table is lost as such, it disadvantageously takes very long time to restore the data.

It is thus desirable to provide a storage device, a computer system, and a storage device access method to which an effective technique of managing user data using address conversion can be applied as it is to operate an address table on a flash memory, access can be made to the address table swiftly and with flexibility, any one specific erase block is protected from intensive rewriting, and the address table can be managed and operated in a simple manner.

According to a first embodiment of the present invention, there is provided a storage device that includes: an address table; a cache memory; a flash memory device that is a storage medium for user data; and a control circuit that is in charge of access management for the flash memory device. In the storage device, the control circuit makes access to the user data on the flash memory device via an address table, in the address table, with an index of an address value generated from an initial logical address, location information is acquired for the user data on the flash memory device corresponding to the index, and the address table is segmented in its entirety into a plurality of small address tables for every area of the index, and the small address tables that are segmentation results are stored in the flash memory device, read as required when the user data is accessed, and expanded on the cache memory with entries of the small address tables.

According to a second embodiment of the present invention, there is provided a storage device that includes: a first address table; a second address table; a memory; a flash memory device that is a storage medium for user data; and a control circuit that is in charge of access management for the flash memory device. In the storage device, the control circuit makes access to the user data on the flash memory device via an address table, in the first address table, with an index of an address value generated from an initial logical address, location information is acquired for the user data on the flash memory device corresponding to the index, the first address table is segmented in its entirety into a plurality of small address tables for every area of the index, and the small address tables that are segmentation results are stored in the flash memory device, read as required when the user data is accessed, and expanded on the cache memory, in the second address table, location information is acquired for any of the small address tables on the flash memory device corresponding to the initial logical address, and when the small address table is stored in the flash memory device, the location information about the small address table on the second address table is concurrently updated, and information about an updated portion of the second address table is simultaneously stored into a backup area in a data group including the small address tables stored on the flash memory device.

According to a third embodiment of the present invention, there is provided a storage device that includes: first address table; a second address table; a memory; a flash memory device that is a storage medium for user data; and a control circuit that is in charge of access management for the flash memory device. In the storage device, the control circuit makes access to the user data on the flash memory device via an address table, in the first address table, with an index of an address value generated from an initial logical address, location information is acquired for the user data on the flash memory device corresponding to the index, the first address table is segmented in its entirety into a plurality of small address tables for every area of the index, and the small address tables that are segmentation results are stored in the flash memory device, read as required when the user data is accessed, and expanded on the cache memory, in the second address table, location information is acquired for any of the small address tables on the flash memory device corresponding to the initial logical address, and the second address table is stored in a nonvolatile RAM (Random Access Memory).

According to a fourth embodiment of the present invention, there is provided a storage device that includes: an address table; a cache memory; a flash memory device that is a storage medium for user data; and a control circuit that is in charge of access management for the flash memory device. In the storage device, the control circuit makes access to the user data on the flash memory device via an address table, in the address table, with an index of an address value generated from an initial logical address, location information is acquired for the user data on the flash memory device corresponding to the index, and the address table is segmented in its entirety into a plurality of small address tables for every area of the index, the small address tables that are segmentation results are stored in the flash memory device, read as required when the user data is accessed, and expanded on the cache memory, and a plurality of entries can be entered to the cache memory, and a first entry including the user data is mixed in with a second entry including any one of the small address tables.

According to a fifth embodiment of the present invention, there is provided a storage device that includes: a flash memory device that is a storage medium; and a control circuit. In the storage device, the control circuit stores, in the flash memory device, both user data provided by a host and management data generated and used in the storage device, and a storage area for the user data and a storage area for the management data are each plurally reserved dynamically on the flash memory device, and the areas are mixed in together.

According to a sixth embodiment of the present invention, there is provided a storage device that includes: an address table; a memory; a flash memory device that is a storage medium for user data; and a control circuit that is in charge of access management for the flash memory device. In the storage device, the control circuit makes access to the user data on the flash memory device via an address table, in the address table, with an index of an address value generated from an initial logical address, location information is acquired for the user data on the flash memory device corresponding to the index, and the address table is segmented in its entirety into a plurality of small address tables for every area of the index, and the small address tables that are segmentation results are stored in the flash memory device, read as required when the user data is accessed, and expanded on the memory, a storage area for each of the small address tables is dynamically reserved for every block area that is a unit for batch erasing of the flash memory device, and is mixed in with a block including the user data, and each of the block areas is stored with the small address tables.

According to a seventh embodiment of the present invention, there is provided a computer system that includes: an address table; a cache memory; a flash memory device that is a storage medium for user data; a control circuit that is in charge of access management for the flash memory device; and a processing device that can make access to the user data on the flash memory device. In the computer system, when the processing device makes access to the user data on the flash memory device, the control circuit makes access to the user data via an address table, in the address table, with an index of an address value generated from an initial logical address, location information is acquired for the user data on the flash memory device corresponding to the index, and the address table is segmented in its entirety into a plurality of small address tables for every area of the index, and the small address tables that are segmentation results are stored in the flash memory device, read as required when the user data is accessed, and expanded on the cache memory with entries of the small address tables.

According to an eighth embodiment of the present invention, there is provided a computer system that includes: an address table; a cache memory; a flash memory device that is a storage medium for user data; a control circuit that is in charge of access management for the flash memory device; a processing device that can make access to the user data on the flash memory device; and a processing device that can make access to the user data on the flash memory device. In the computer system, the control circuit makes access to data in the flash memory device via an address table, in the address table, with an index of an address value generated from an initial logical address, location information is acquired for the user data on the flash memory device corresponding to the index, and the address table is segmented in its entirety into a plurality of small address tables for every area of the index, the small address tables that are segmentation results are stored in the flash memory device, read as required when the user data is accessed, and expanded on the cache memory, and a plurality of entries can be entered to the cache memory, and a first entry including the user data is mixed in with a second entry including any one of the small address tables.

According to a ninth embodiment of the present invention, there is provided a storage device access method of making access to user data on a flash memory device that includes the steps of making access to the user data on the flash memory device via an address table, in the address table, with an index of an address value generated from an initial logical address, acquiring location information for the user data on the flash memory device corresponding to the index, and segmenting the address table in its entirety into a plurality of small address tables for every area of the index, and storing the small address tables that are segmentation results in the flash memory device, reading the small address tables as required when the user data is accessed, and expanding the small address tables on a cache memory with entries of the small address tables.

According to a tenth embodiment of the present invention, there is provided a storage device access method of making access to user data on a flash memory device that includes the steps of making access to the user data on the flash memory device via an address table, in the address table, with an index of an address value generated from an initial logical address, acquiring location information for the user data on the flash memory device corresponding to the index, and segmenting the address table in its entirety into a plurality of small address tables for every area of the index, storing the small address tables that are segmentation results in the flash memory device, read as required when the user data is accessed, and expanding on a cache memory, and entering a plurality of entries to the cache memory, and mixing in a first entry including the user data together with a second entry including any of the small address tables.

According to the embodiments of the invention, a control circuit makes access to user data in a flash memory device via an address table. In the address table, with an index of an address value generated from an initial logical address, location information is acquired for the user data on the flash memory device corresponding to the index. The address table is segmented in its entirety into a plurality of small address tables for every area of the index. The small address tables that are segmentation results are stored in the flash memory device, read as required when the user data is accessed, and expanded on a cache memory with entries of the small address tables.

The invention has the advantage of being able to apply an effective technique using address conversion to manage user data as it is to operate an address table on a flash memory. This advantageously implements swift and flexible access making to the address table, prevents intensive rewriting to any one specific erase block, and simplifies the management and operation of the address table.

BRIEF DESCRIPTION OF THE DRAWINGS

FIGS. 6A to 6C are diagrams, respectively, showing exemplary configurations of a table list, an address table, and a search table of the first embodiment;

FIG. 11 is a diagram showing an exemplary address index and a cache table for use in making access to an address table in a third embodiment;

FIGS. 13A to 13C are diagrams showing, respectively, an exemplary table list, an address table, and a cache table in a fourth embodiment;

FIGS. 15A to 15C are diagrams showing, respectively, an exemplary table list, address table, and cache table in a fifth embodiment;

FIGS. 21A to 21C are diagrams showing, respectively, an exemplary configurations of a table list, an address table, and a search table in the sixth embodiment;

FIGS. 23A to 23C are diagrams showing, respectively, exemplary configurations of a table list, an address table, and a search table in a seventh embodiment.

DETAILED DESCRIPTION OF THE INVENTION

Below, embodiments of the invention are described with a correlation to the accompanying drawings.

Figure 1:
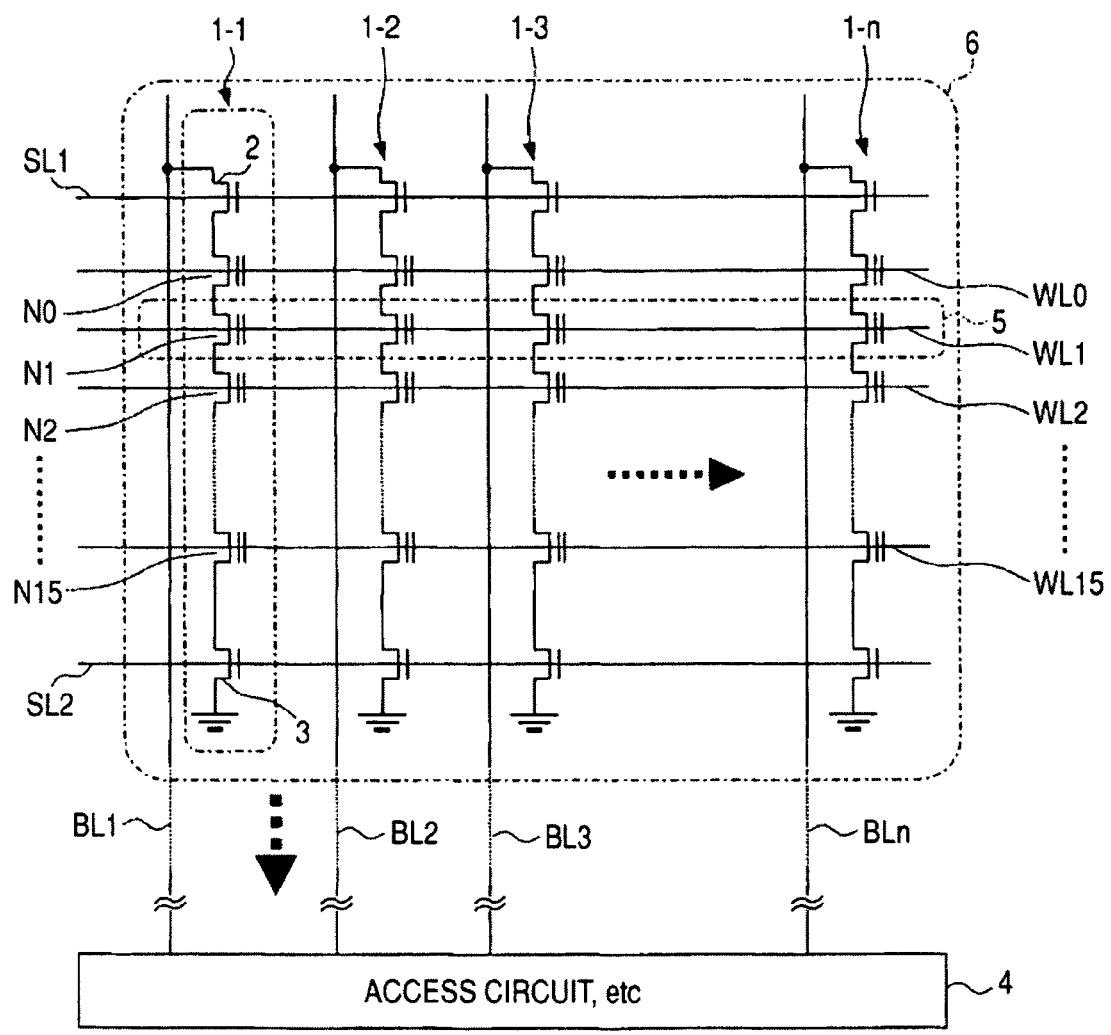
FIG. 1 is a diagram showing an exemplary internal configuration of a NAND flash memory.
Figure 2:
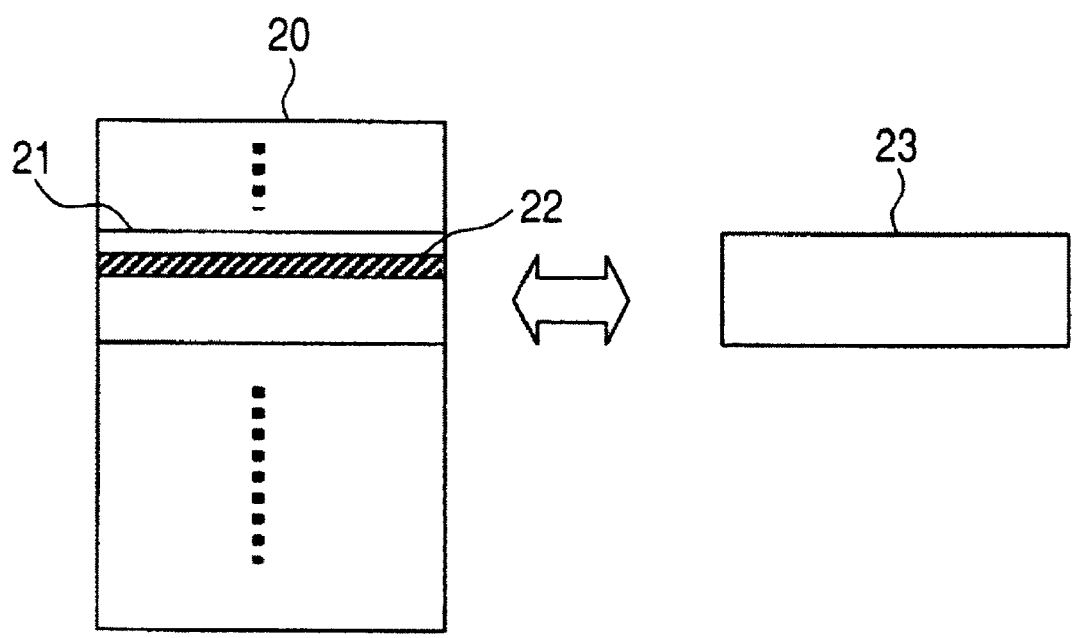
FIG. 2 is a diagram showing an exemplary data update in the flash memory.
Figure 3A:
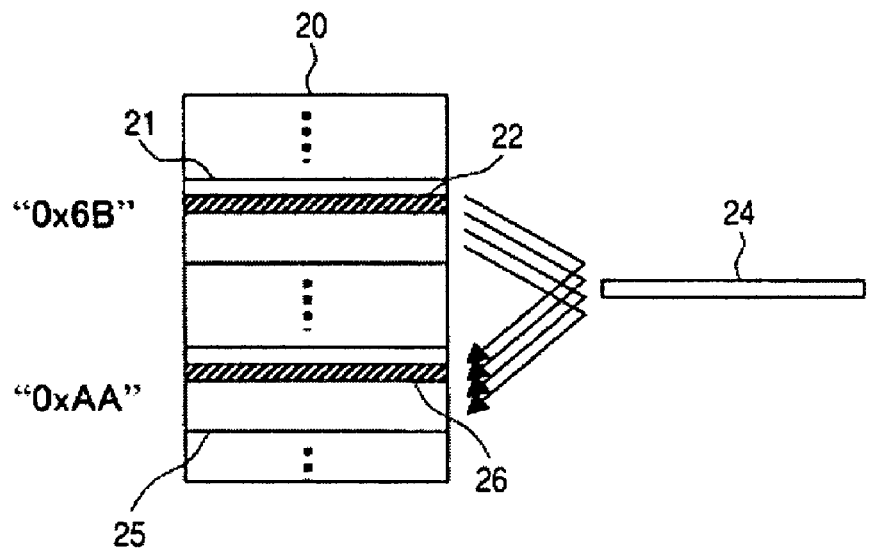
FIGS. 3A and 3B are both diagrams showing an exemplary method of performing address conversion on an erase block basis.
Figure 3B:
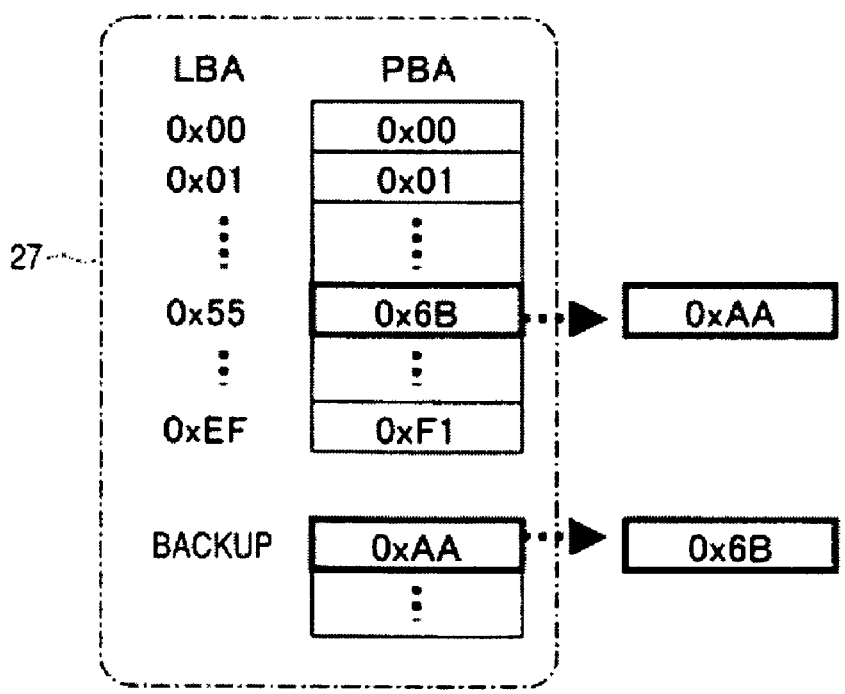
Figure 4A:
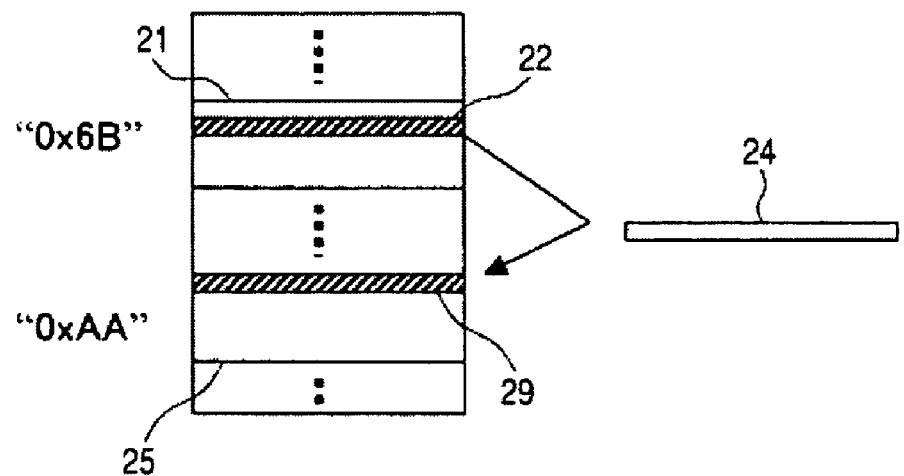
FIGS. 4A and 4B are both diagrams for illustrating a management method in a write-once read-many-times storage system.
Figure 4B:
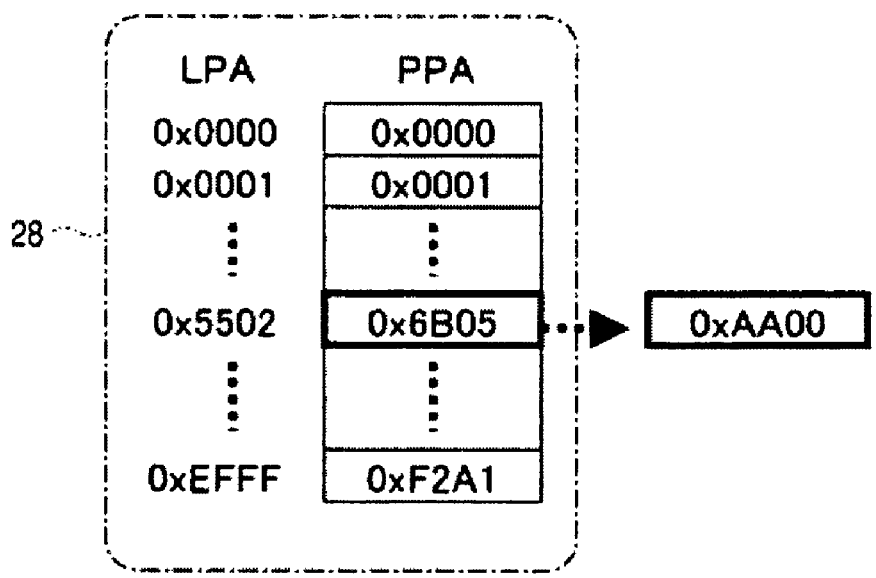
Figure 5:
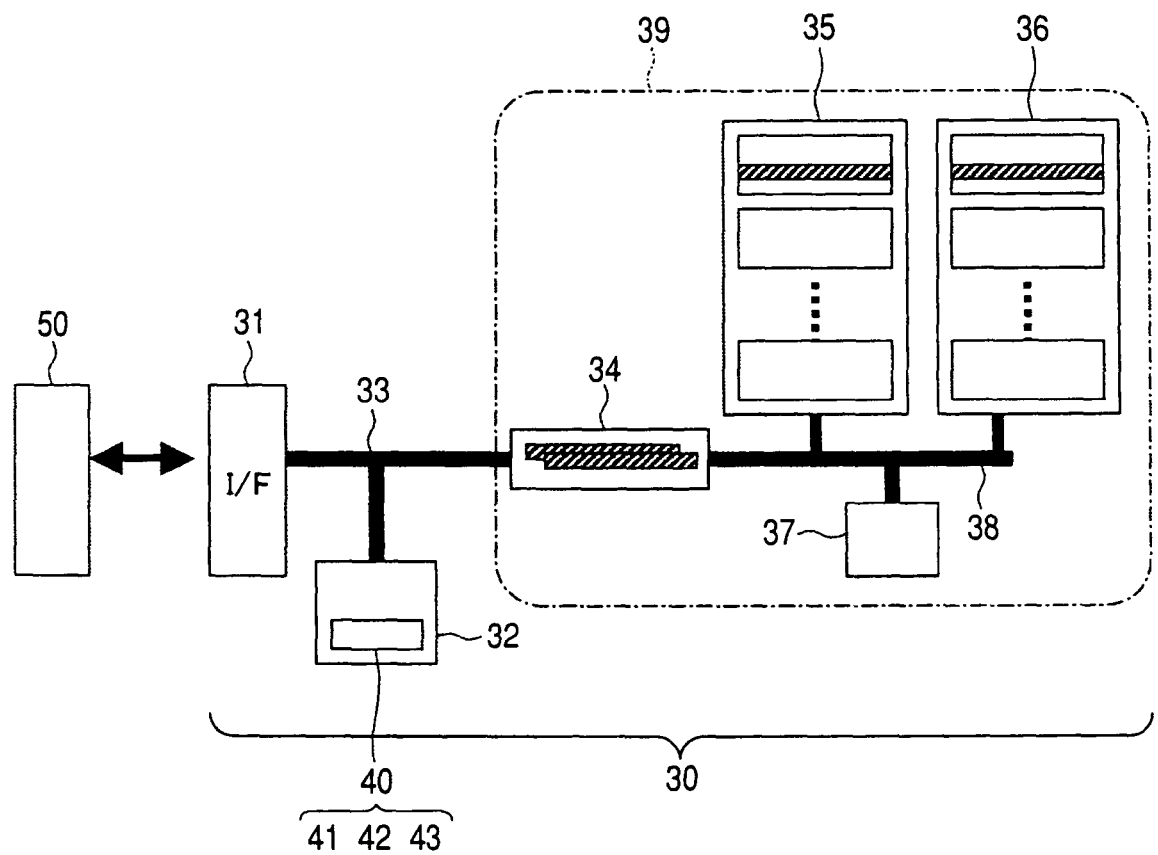
FIG. 5 is a diagram showing an exemplary configuration of a computer system in which a storage device of a first embodiment of the invention is adopted.

FIG. 5 is a diagram showing an exemplary configuration of a computer system in which a storage device of a first embodiment of the invention is adopted.

A computer system COMSYS is configured to include, mainly, a file storage device 30 and a host system (processing device) 50.

The file storage device 30 is configured to include an interface circuit (I/F) 31, a control circuit 32, an internal bus 33, a page buffer 34, NAND flash memories 35 and 36, a control circuit 37, and a memory bus 38.

The control circuit 32 includes a RAM (Random Access Memory) 40, which carries therein a table list 41, an address table 42, and a search table 43.

The host system 50 is configured to include a CPU (Central Processing Unit), a RAM, a ROM (Read Only Memory), a system bus, and others.

In the file storage device 30, the 32-bit memory bus 38 is connected in parallel with the two-chip 8 Gb NAND flash memories (also referred to as flash memory chips) 35 and 36 having an input/output of 16 bits. The two-chip NAND flash memories 35 and 36 are accessed simultaneously in parallel for data reading and writing. That is, the memory bus 38 is configured to include two channels of 16-bit bus. The flash memories each make an access for data writing and reading for every page of 4 kB, for example. As the actual page size, 8 kB is thus accessed in batch.

For brevity, the flash memory' chips are assumed as erasing data for every erase block of 1 MB, and each of the erase blocks are assumed as including 256 pages. In this case, 2 MB of data is erased all at once in an actual erase block, which is configured by 256 actual pages. The details are left for a later description.

The page buffer 34 temporarily stores therein data in any accessed page area. Data exchange between the flash memories 35 and 36 and the page buffer 34 is under the control of the control circuit 37.

The control circuit 37 also applies error correction to transfer data as required by ECC coding or manages any defective block in the flash memories. The flash memories 35 and 36 receive/forward data from/to the internal bus 33 of the storage device via the page buffer 34.

That is, the circuit group including the page buffer 34, the NAND flash memories 35 and 36, the control circuit 37, and the memory bus 38 configures substantially one flash memory device (also referred to as flash memory module) 39, and it is regarded as being connected to the internal bus 33 of the storage device. The total capacity of the flash memory device 39 is 16 Gb (2 GB), and the actual page size is 8 kB, i.e., the device carries therein 256 k pieces of page data.

The internal bus 33 is connected with the I/F circuit 31 and the control circuit 32.

The I/F circuit 31 takes charge of data or command exchange with the host system 50 in accordance with specifications such as ATA (Advanced Technology Attachment) or PCI (Peripheral Component Interconnect) express.

The control circuit 32 manages data exchange inside of the storage device, i.e., between the page buffer 34 and the I/F circuit 31.

The RAM 40 equipped in the control circuit 32 is provided with a cord area or a working area for program execution. The RAM 40 also includes therein an address table 42, a table list 41, and a search table 43. The address table 42 is in charge of managing a virtual address for every page, and the table list 41 manages such an address table. The search table 43' is used to make a search of any appropriate page available for data writing.

In the computer system COMSYS, the host system 50 is under the control of the internally-equipped CPU, and when a command comes from an application or an operating system (OS), it stores laser data into the flash memory device 39 via the file storage device 30.

The control circuit 32 is involved for data exchange for the duration and takes charge of access management with address conversion using the table list 41, the address table 42, and others.

Similarly to a hard disk or others, the file storage device 30 makes an access for every sector of 512 Bytes.

For brevity, in the storage device, hexadecimal addresses are presumed as being assigned as below.

Assuming that an external input address is "0x05502C", the high-order 20 bits of "0x05502" is a page address, and 1M page can be managed at the maximum. On the other hand, the low-order 4 bits of "0xC" is a sector address in the page area, and a page includes 16 sectors.

The storage device is capable of random access on a sector basis through selection of data in the page buffer 34.

In this embodiment, page-basis virtual address management is adopted.

Figure 7:
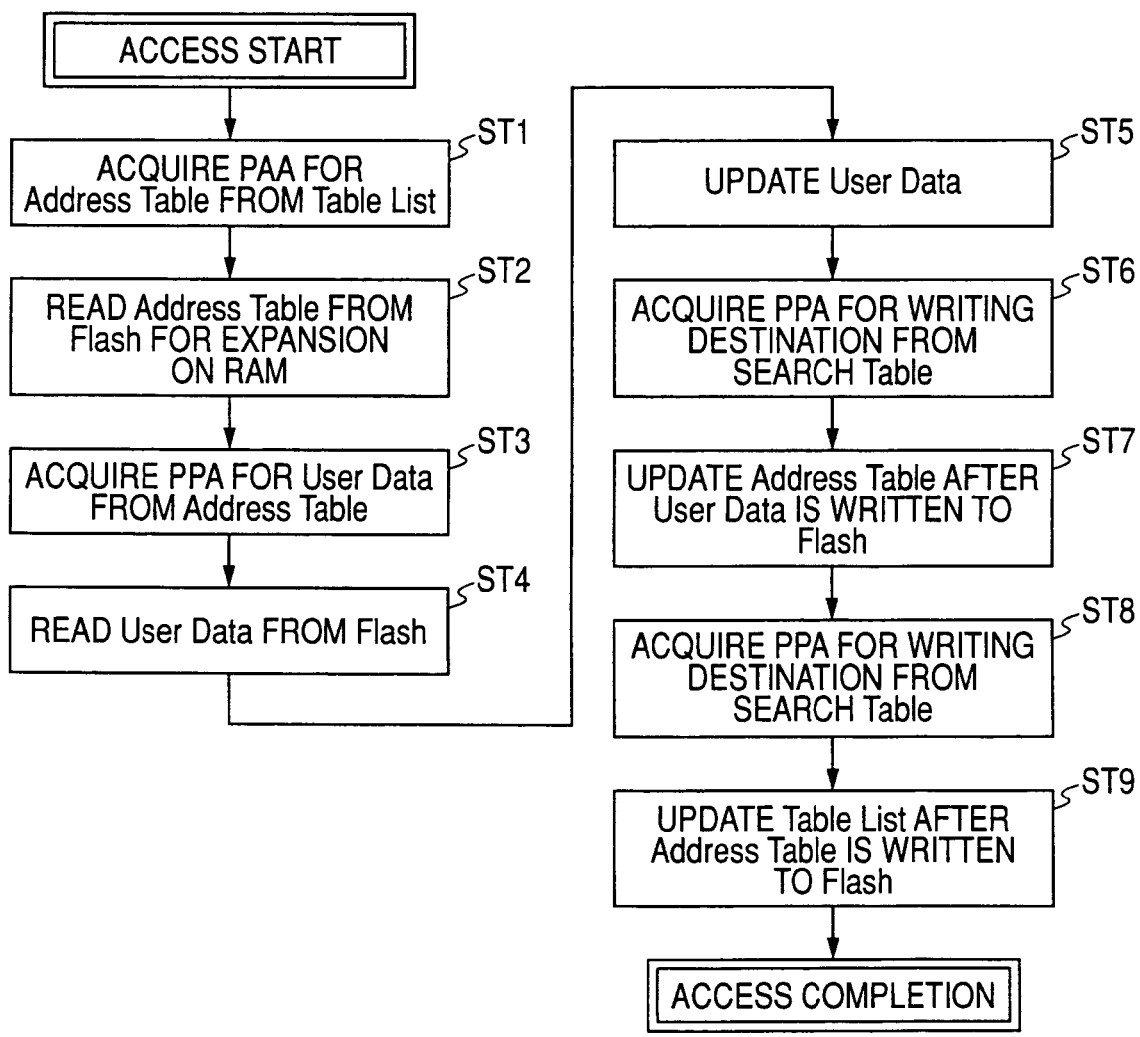
FIG. 7 is a flowchart of data access using the table list, address table, and search table of the first embodiment.

FIGS. 6A to 6C are diagrams showing, respectively, exemplary configurations of the table list 41, the address table 42, and the search table 43 of the first embodiment. FIG. 7 is a flowchart of data access using the table list 41, the address table 42, and the search table 43 of the first embodiment.

In accordance with the flowchart of FIG. 7, the following procedure is sequentially executed to make access to the flash memory module 39 inside of the file storage device 30.

Step ST1:

When a sector address of "0x05502C" comes from the host system 50 together with an access command for user data, the control circuit 32 first receives the high-order address thereof and makes access to the internal RAM 40. From the table list 41 resident in the RAM 40, the control circuit 32 then acquires information about the location of the corresponding address table 42.

The table list 41 is provided with a table index (T-Index), which is segmented on the basis of a logical page address area of 2 k page. In this example, used as the index are the high-order bits up to "0000_0101_0" in those of "0000_0101_0101" (binary expression of "0x055") of the sector address. That is, a physical page address PPA "0x030B0" that indicates the location of the address table corresponding to the index of "0x050" is acquired.

Step ST2:

Using the physical page address, the flash memory module 39 is accessed, and a page group including an address table is readout into the page buffer 34. The page group is expanded on the RAM 40, and the address table 42 is created.

The address table 42 carries information of 4 bytes (32 bits) corresponding to each of the logical page addresses LPA, and 20 bits thereof are a physical page address PPA on the flash memory module. The remaining bits are for historical information including a time stamp at the time of data update, the update frequency, and others.

As described above, one address table covers the logical page address of 2 k page, and the total capacity thereof is 8 k bytes (4 bytes×2 k), which corresponds to the capacity of a page that is a unit for batch writing.

Step ST3:

From the logical address "0x05502C" of the sector again, the address table 42 is referred to with an index of the logical page address LPA "0x05502" so that a physical page address PPA "0x060B0" is acquired for the user data that is an access target.

Step ST4:

Using the physical page address PPA, the flash memory module 39 is accessed again, and a page group including the user data is read out into the page buffer 34. This operation is exactly the same as that for reading the address table in step ST2, so that the procedure can be executed under unified management.

Any portion corresponding to a sector address "0xC" is then selectively forwarded from the page buffer 34 to the side of the host system 50, and this is the end of the reading operation.

The data is updated as described below. Assumed here is that the same sector of "0x05502C" is to be updated. In this case, there is a need to read any desired page to the page buffer 34, and the procedure is the same as that for steps ST1 to ST4.

Steps ST1 to ST4:

Similarly to the operation of data reading, any desired data read from the flash memory module 39 is stored in the page buffer 34.

Step ST5:

Any desired portion of the sector is updated on the page buffer 34.

Step ST6:

As a writing destination in the flash memory module 39 of the updated user data, the search table 43 resident in the RAM 40 is searched for a physical page address PPA for any appropriate page area. For brevity, the physical page address is assumed as being configured by a high-order-12-bit physical block address (PBA) and a low-order-8-bit page offset. In this case, the erase blocks are each configured by 256 pages ($2^8$).

The search table 43 carries therein a flag for every block, indicating whether the pages inside are valid or invalid. As will be described later, when a page is made invalid, the corresponding flag is set to "1". The "Used Flag" indicates whether the blocks are currently in use or available of ter having data erased.

The data writing is performed sequentially from the head page of any data-erased block. The physical address of the previously-written page is stored in a register 44, and the page number derived by incrementing the number of previous page is selected as a writing destination. When the selecting number reaches the tail of the block, the blocks onwards are scanned to find their "Used Flag", and the next not-used block is detected so that the head page thereof is selected.

The current value of the register 44 is "0x0AA01" and as a writing destination of the user data, the control circuit 32 first selects a physical page address "0x0AA02" that is an increment result of the current value.

Step ST7:

Using the physical page address PPA, the flash memory module 39 is accessed, and the user data in the page buffer 34 is written in batch to the flash memory module. When data writing is completed, the address table 42 is updated, and the physical page address PPA corresponding to the logical page address LPA "0x05502" is updated to "0x0AA02". The page area corresponding to the previous physical page address "0x060B0" is made invalid, and the flag corresponding to the page in the search table 43 is changed to "1".

Step ST8:

The update details of the address tables 42 also are required to be reflected onto the flash memory module. At this time, as a writing destination of the address table to the flash memory module, the search table 43 is searched again for a physical page address PPA of any appropriate free page area.

That is, similarly to the operation of updating the user data in step ST6, the value of the register 44 is incremented, and the physical page address "0x0AA03" is selected.

Step ST9:

Using the physical page address, the flash memory module 39 is accessed again. The address table 42 is first copied and transferred from the RAM 40 to the page buffer 34, and then it is written, in batch, to the flash memory module as a page group.

Once the data writing is completed, the table list 41 is updated, and the physical page address PPA corresponding to the table index (T-Index) "0x050" is updated to "0x0AA03". The page area corresponding to the previous physical page address "0x030B0" is made invalid, and the flag corresponding to the page in the search table 43 is changed to "1".

The above procedure is summarized below.

1. Based on the location information acquired from the table list 41, the address table 42 is acquired from the flash memory module 39 (steps ST1 and ST2).

2. Based on the location information acquired from the address table 42, user data is acquired from the flash memory module 39 (steps ST3 and ST4).

3. The user data is updated on the page buffer 34 (step ST5).

4. The user data is stored in an area available in the flash memory module, and the address table 42 is updated (steps ST6 and ST7).

5. The address table 42 is stored to an area available in the flash memory module, and the table list 41 is updated (steps ST8 and ST9).

As described above, for reading and acquiring the address table 42 from the flash memory module 39, and for writing and storing of the address table 42, the location information is used as a basis with a unit of the same data size. The location information here is a physical page address having the same format as the user data or a format compatible therewith. The data size of the unit is an 8-kbyte page group that is a unit for batch writing. The former page group and the latter page group are assumed to be stored in the flash memory module in no particular order. For example, in steps ST7 and ST9, the user data and the address table 42 are sequentially written on a page group basis in an erase block corresponding to the physical block address PBA of "0x0AA". The user data and the address table 42 are mixed in together in the same erase block.

Such a configuration allows the control circuit 32 to manage both the user data and the address table 42 in a unified manner, and the address table 42 becomes accessible with flexibility and swiftness like the user data.

In the computer system of the embodiment, if the file storage device 30 is a mobile medium, the computer system needs to be ready for instantaneous power interruption, e.g., abrupt removal, in terms of resistance. Even if the file storage device 30 is not mobile but fixed, the computer system still needs to be ready for instantaneous power interruption of the computer device itself.

In such a case, especially when the RAM 40 is an SRAM (Static Random Access Memory) or a DRAM (Dynamic Random Access Memory), there is a concern if the table list 41 resident therein is lost. The possible measures therefor are described below.

First of all, in step ST9, before the address table 42 is written to the flash memories 35 and 36, it is desirable that the data is provided with a backup area for storage of the table index on the corresponding table list 41. This is equivalent to the information about any updated portion of the table list after the address table 42 is written to the flash memory.

In this manner, if a physical page address PPA of the address table is provided, the address table stored in the flash memory is accessed so that the corresponding table index (T-Index) can be acquired. That is, the table list can be searched in an inverted order.

This enables the creation of the table list 41 again even if the list is accidentally lost, i.e., the page groups are read by scanning the physical page addresses, and the relationship is checked for the physical page addresses and the table indexes (T-Indexes) in the respective address tables.

In consideration of such table recreation, the backup area preferably includes therein historical information such as a time stamp together with the table index. This is aimed to distinguish which is a new address table if the table indexes in storage are the same.

The issue here is that if the flash memory module is considerably increased in capacity with the larger number of pages, it means that an enormous amount of time will be consumed for scanning. As such, there is a demand not only for measures to take for backup but also for measures easier to take. In such a case, it is effective to use a nonvolatile RAM, e.g., a ferroelectric memory.

That is, if the RAM 40 is at least partially a nonvolatile RAM to make the table list 41 resident therein, the table list 41 can be satisfactorily protected from being lost even if an instantaneous power interruption occurs.

As the nonvolatile RAM, an FeRAM (Ferroelectric RAM) using a ferroelectric film, an MRAM (Magnetic RAM) using a ferromagnet, an OUM (Ovonic Unified Memory) using a phase change material, a RRAM (Redundant RAM), and the like are proposed.

The FeRAM is a semiconductor memory that stores data utilizing the difference of the polarization direction of a ferroelectric capacitor. As an example, there is a proposal for an embodiment thereof by S. Sheffeield et al. in U.S. Pat. No. 4,873,664.

The MRAM is a semiconductor memory that stores data using the difference of the spin direction of the ferromagnetic film. As an example, there is the paper written by R. Scheuerlein et al. in ISSCC2000 Technical Digest, p. 128.

The OUM is a semiconductor memory that stores data using the phase transition of a chalcogenide film. As an example, there is the paper written by S. Lai et al. in IEDM2001 Technical Digest, p. 803. The OUM is recently referred to also as PRAM (Parameter RAM).

The RRAM is a semiconductor memory that stores data using the resistance hysteresis of a magnetoresistance material. As an example, there is the paper written by W. W. Zhuang et al. in IEDM 2002 Technical Digest, 7.5.

Order-of-magnitude improvements are observed in these nonvolatile memories in terms of cell-level access speed and rewriting frequency compared with the flash memory.

The expression of "the page group of the flash memory device" in this embodiment means the basic unit for any successive data to be written to the flash memory module 39 in batch, for example. When the module is configured by a plurality of chips 35 and 36, no dependence is observed in the timing setting for data transfer or writing to the chips.

In this embodiment, two 16-bit IO (Input/Output) chips are connected to a 32-bit bus so that the operation is executed completely in parallel. If a 16-bit bus is shared by any two chips, data transfer has to be performed separately. In this case, while data is being transferred from the page buffer 34 to one of the memory chips, data writing may be started in the other memory chip, or data transfer may be first performed to both of the memory chips, and then the data writing may be started at the same time for both chips.

That is, the flash memory module 39 including the flash memory chips 35 and 36 and/or the control circuit, for example, can be regarded as substantially a single flash memory device. Irrespective of the internal operation timing, the basic unit for batch writing is represented as a page group.

In the embodiment, the index of the address table or the table list is a part of the logical addresses provided by the host. Alternatively, the indexes may be entirely or partially the values derived by applying specific conversion or calculation to the logical addresses.

For example, with the interface for some hard disk, the initial logical addresses are not a series of sector addresses as described above but are three-dimensional (3D) addresses that are combinations of a cylinder number, a head number, and a sector number. The indexes may be a part of the values of the 3D addresses or a part of the values of sector addresses that are conversion results of the values of the 3D addresses. Other than these, no matter what format the initial logical addresses take, any values can be used as indexes as long as they are uniquely derived based on the initial logical addresses.

In this embodiment, the location information of a page group acquired from the address table or the table list is used as a physical page address in the flash memory module 39. Alternatively, the physical page address may be acquired by first acquiring any intermediate location information, and then by applying computation or conversion to a value of the information. As a possible example, for the aim of preventing intensive access to any defective block, a true physical page address may be derived by applying conversion to any block address portion of the address derived as above.

As such, in the first embodiment, the technique of swiftly accessing a huge-capacity address table appropriately as required by storing the address table together with user data in the flash memory module 39 is proposed. The address table and the user data are treated the same.

Next, a second embodiment of the invention, caching of an address table is described.

If the flash memory is accessed every time the user data is accessed and the address table is operated as in the first embodiment, a no-negligible overhead is generated by data access even if the access operation is executed at high speed. Therefore, it is considered desirable to reserve an area of the RAM 40 as a cache memory of the address table and reduce the frequency of access making directly to the flash memory module 39.

To update any cached address table, write-back caching leads to better efficiency compared with write-through caching. With the write-back caching, the update result is collectively reflected to the flash memory at the time of entry release, for example, and with the write-through caching, the update result is reflected to the flash memory whenever the data is updated.

For such caching, desirably, instead of a single entry, a plurality of address tables may be stored as entries to put those under the high-level cache control using a cache table. This favorably leads to a higher hit ratio, and the overhead can be almost eliminated.

Figure 8:
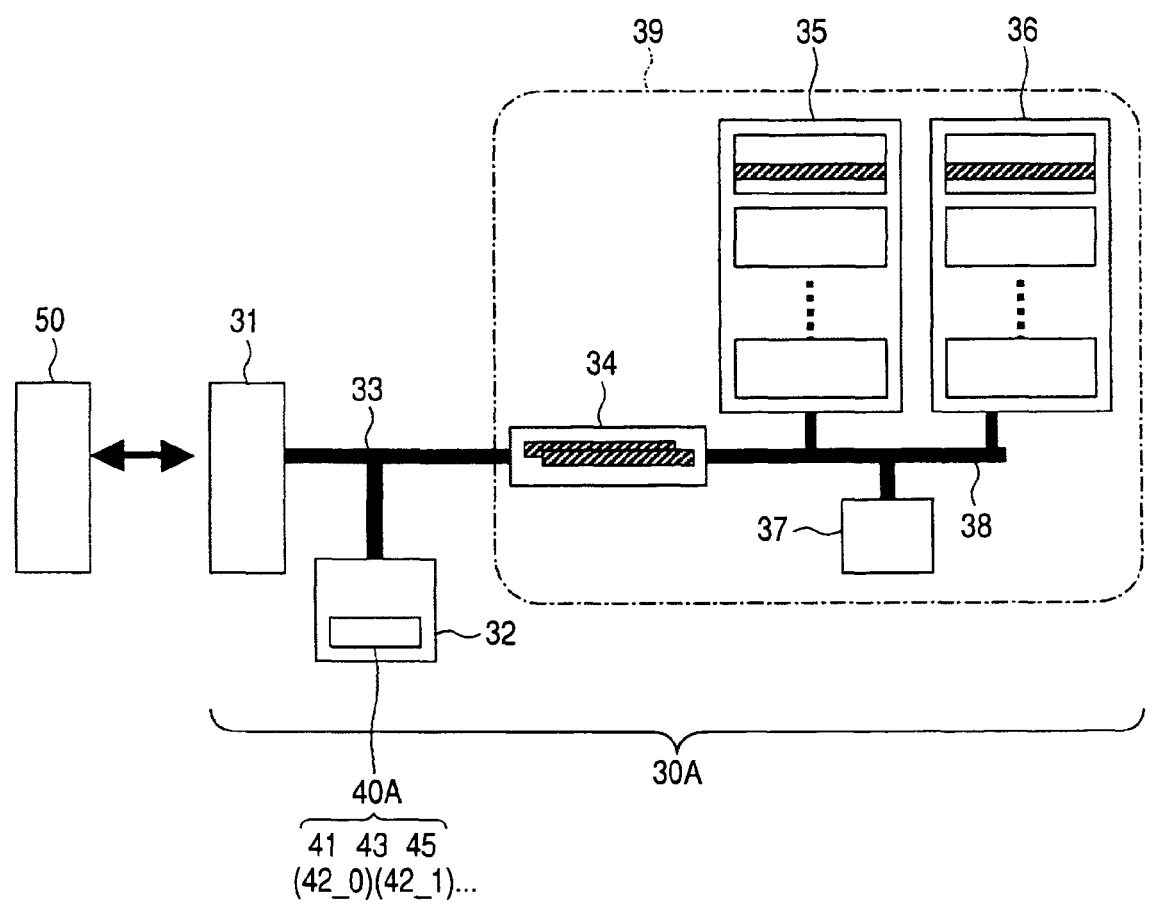
FIG. 8 is a diagram showing an exemplary configuration of a computer system in which a storage device of a second embodiment of the invention is adopted.

FIG. 8 is a diagram showing an exemplary configuration of a computer system in which a storage device of the second embodiment of the invention is adopted. FIG. 8 shows an exemplary embodiment in which a cache memory of an address table is installed.

The hardware configuration is similar to the first embodiment of FIG. 5 except for an internal RAM 40A including the table list 41, a plurality of address tables 42 (42_0 to 42_*n* where n is an integer), the search table 43, and a cache table 45. The address tables 42 and the search table 43 are similar in configuration to those of the first embodiment shown in FIG. 6.

Figure 9A:
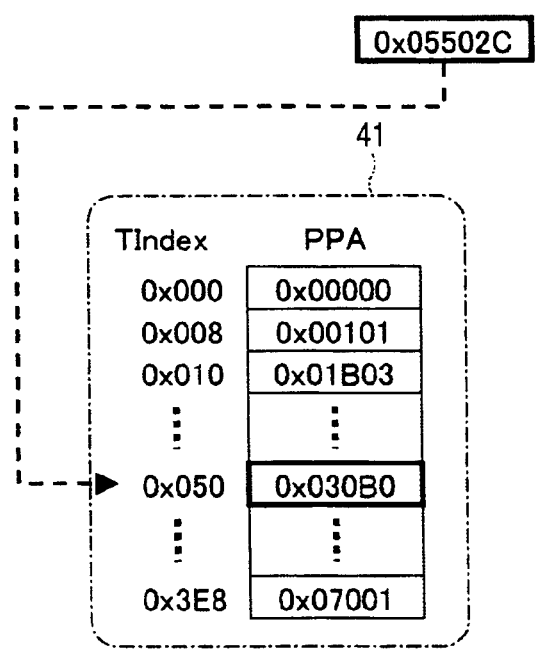
FIGS. 9A and 9B are diagrams showing, respectively, an exemplary address index and a cache table for use in making access to an address table in the second embodiment.
Figure 9B:
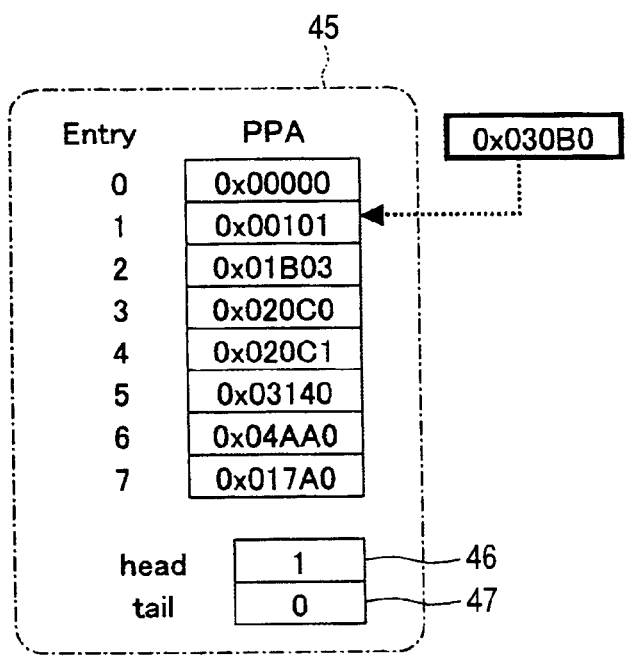
Figure 10:
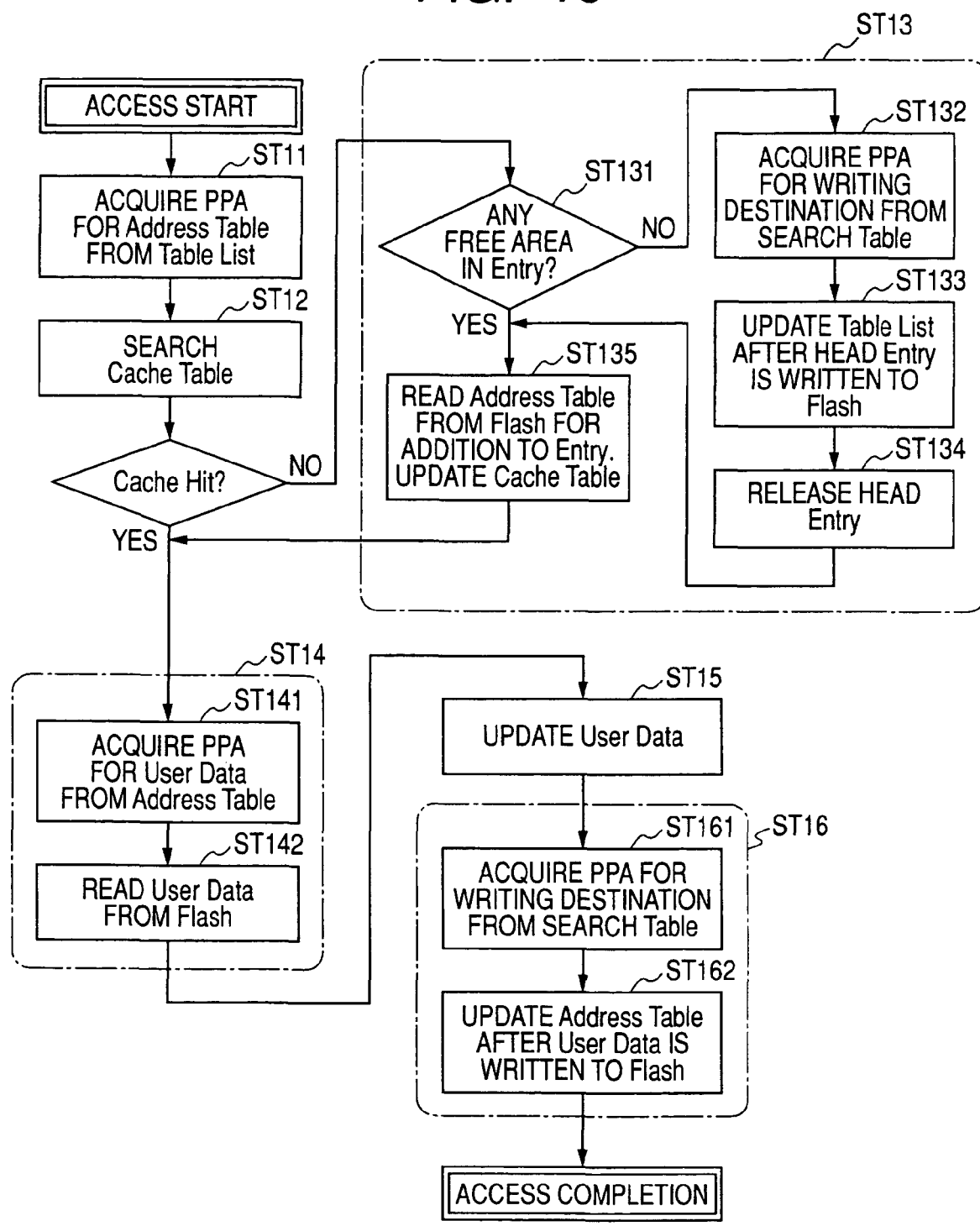
FIG. 10 is a flowchart of data access in the second embodiment.

FIGS. 9A and 9B are diagrams showing, respectively, an exemplary address index and cache table for use making access to an address table in the second embodiment. FIG. 10 is a flowchart of data access in the second embodiment.

In accordance with the flowchart of FIG. 10, the following procedure is specifically executed to make access to the flash memory module 39 inside of a file storage device 30A.

Step ST11:

When a sector address of "0x05502C" comes from the host system 50 together with an access command for user data, the control circuit 32 first receives the high-order address thereof and makes access to the internal RAM 40A. From the table list 41 resident in the RAM 40A, the control circuit 32 then acquires information about the location of the corresponding address table. Similarly to the first embodiment, the high-order 9 bits of the logical address are used, and a physical page address PPA "0x030B0" is acquired, indicating the location of an address table corresponding to the table index of "0x050".

Step ST12:

Using the physical page address PPA, the cache table 45 is searched to check whether there is any cache hit or not. The cache table 45 has eight entries, each corresponding to a predetermined storage area inside of the RAM 40A. The entries are managed by round-robin scheduling (first-in first-out), and any new entry is added to the last. The head entry and the tail entry are under the control of registers 46 and 47, respectively.

In the FIGS. 9A and 9B examples, the physical page address "0x030B0" matches none of the physical page address fields PPA of the entries. It means that the RAM 40A carries no desired address table, thereby resulting in a cache miss.

Step ST13:

When a cache miss occurs, any desired address table is read from the flash memory module 39, and it is expanded on an area available in the internal RAM 40A. In this case, the free area is reserved in the RAM with the following procedure, and an address table is expanded thereon.

Release of Existing Entry

Step ST131:

The registers 46 and 47 in the cache table 45 show that the tail entry is "0", and the head entry is "1", i.e., the next number of 0. This means that the entries have no free area.

Steps ST132 to ST134:

For releasing the head entry "1", the address table therein is written back to the flash memory module 39. The procedure therefor is similar to that in the first embodiment (steps ST8 and ST9 of FIG. 7), i.e., a physical page address is acquired from the search table 43 for data writing thereto, and any corresponding portion in the table list 41 is updated. Note here that if a data backup area also is provided to the address table on the cache memory for storage therein a table index (T-Index) on the corresponding table list, the portion to be updated can be instantaneously defined. Thereafter, the head entry is released, and the value in the register 46 for the head entry is incremented to "2".

Expansion of Address Table

Step ST135:

A page of the physical page address "0x030B0" is read from the flash memory module 39 and expanded to an area designated by the entry "1" of the RAM 40A. At this time, a new entry "1" is added, and the value in the register 47 for the tail entry is responsively incremented to "1". The physical page address corresponding to the entry "1" on the cache table 45 is updated to "0x030B0".

Step ST14:

From the cache data of the address table expanded on the internal RAM 40A, a physical page address is acquired for the user data corresponding to the logical page address "0x05502" (step ST141). Based thereon, a page group carrying therein any desired user data is read from the flash memory module 39 to the page buffer 34 (ST142), thereby enabling data access via the page group. This procedure is the same as the one exemplified in the first embodiment (steps ST3 and ST4 of FIG. 7).

Step ST15:

Any desired portion of the sector is updated on the page buffer 34.

Step ST16:

The page group on the page buffer 34 is written back to the flash memory module 39. The procedure at this time is similar to that of the first embodiment (steps ST6 and ST7 of FIG. 7), i.e., after a physical page address PPA of a free area is acquired from the search table 43 (step ST161), and after the data is written thereto, any corresponding portion in the address table, i.e., a physical page address corresponding to the logical page address "0x05502", is updated to the address of a new writing destination (step ST162).

In the second embodiment, the address table is written back to the flash memory module for the first time in step ST13, i.e., at the time of entry release. That is, the second embodiment adopts write-back caching, and a plurality of entries can be stored.

In the second embodiment, the table list 41 is used to manage the information about the locations of the address tables on the flash memory modules 39. This favorably enables allocation of address tables to the flash memory module 39 in a flexible and dynamic manner and achieves complicated management of cache entries.

Such management serves especially well when the address tables are scattered throughout the flash memory module, and mixed in the flash memory module together with the user data. Note that, even if the address tables are collectively stored in any specific erase block, it is still considered effective in terms of increasing the flexibility for a storage order, for example.

In this embodiment, the entries in the cache memory are managed by the physical page addresses, which are acquired from the initial logical address using the table list 41. That is, each tag field of the entries in the cache table 45 carries therein the physical page address PPA.

The address tables stored in the cache memory and the flash memory module each include a backup data area, which stores a table index (T-Index) of the table list 41 corresponding to the respective address tables.

If a physical page address PPA of the address table is provided, the address table can be accessed in the cache memory or the flash memory module, and any corresponding table index (T-Index) can be acquired. If a search can be made in an inverted order as such, at the time of entry release in step ST13, any index corresponding to the releasing entry can be swiftly acquired so that the table list 41 can be accordingly updated.

Moreover, as described in the first embodiment, even if the table list is lost, the list can be created again by scanning the address tables stored in the flash memory module 39.

Now, a third embodiment that is a modified version of the second embodiment, with a different procedure of accessing the cache memory and the flash memory module 39, is described.

Figure 12:
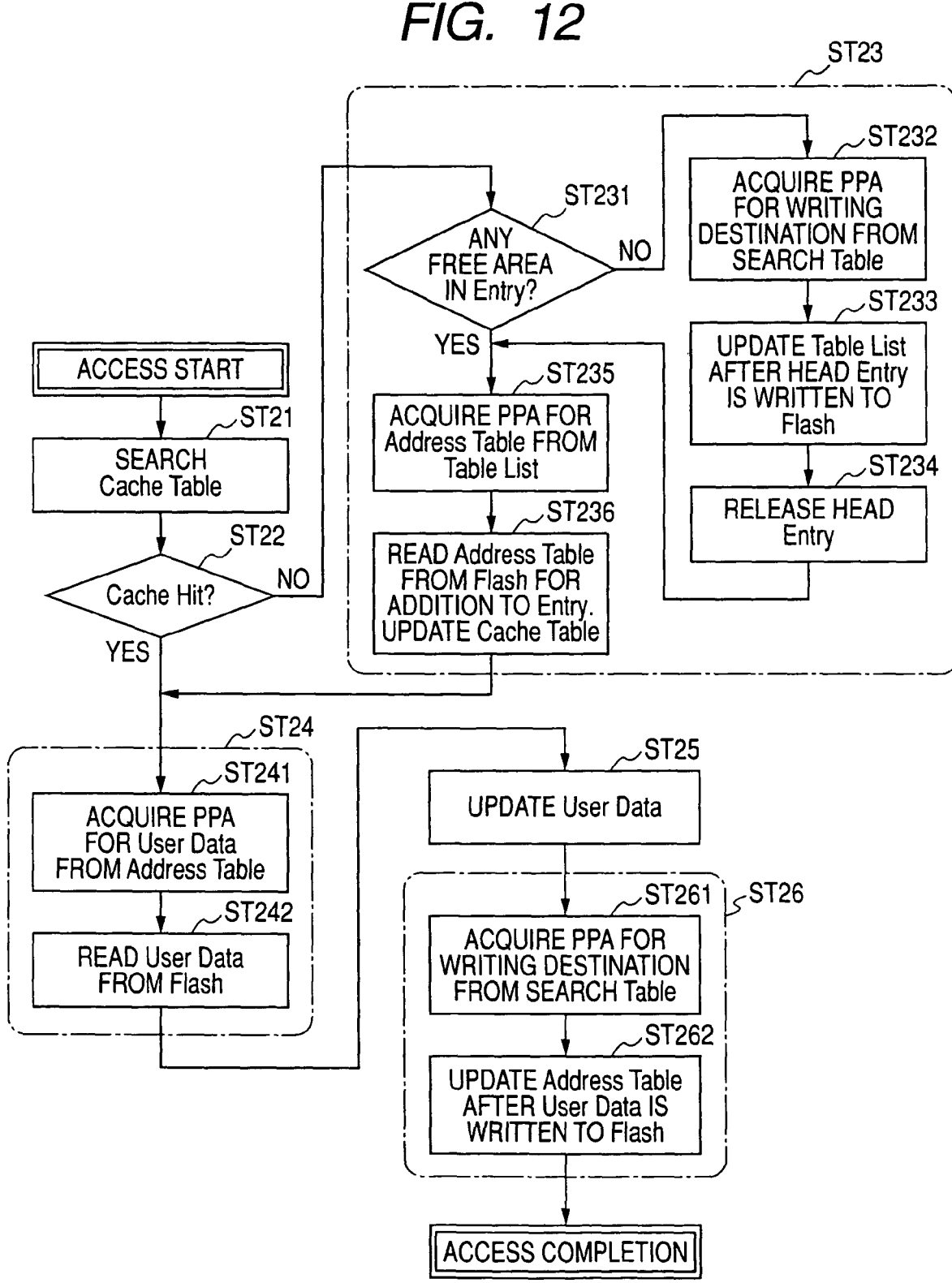
FIG. 12 is a flowchart of data access in the third embodiment.

FIG. 11 is a diagram showing an exemplary address index and cache table for use in making access to an address table in the third embodiment. FIG. 12 is a flowchart of data access in the third embodiment.

In the third embodiment, entries of any cached table are managed in the format corresponding to the table index (T-Index) of a table list 41b. That is, tag fields of the entries in a cache table 45b each carry therein a table index (T-Index).

The procedure of accessing user data in the third embodiment with a correlation to the access flowchart of FIG. 12 is described below.

Steps ST21 and ST22:

When a sector address of "0x05502C" comes from the host system 50 together with an access command for user data, a table index "0x050" is generated from the high-order address thereof, and the value thereof is used to search the cache table 45b, thereby checking whether there is any cache hit or not.

The cache table 45b has eight entries, each corresponding to a predetermined storage area inside of the RAM 40A. The entries are managed by round-robin scheduling (first-in first-out), and any new entry is added to the last. The head entry and the tail entry are under the control of registers 46b and 47b, respectively.

In the FIG. 11 example, the table index "0x050" matches none of the table index fields (T-Index) of the entries. It means that the RAM 40A carries no desired address tables, thereby resulting in a cache miss.

Step ST23:

When a cache miss occurs, any desired address table is read from the flash memory module 39 and is expanded on an area available in the internal RAM 40A. In this case, the free area is reserved in the RAM according to the following procedure, and an address table is expanded thereon.

Release of Existing Entry

Step ST231:

The registers 46b and 47b in the cache table 45b show that the tail entry is "0", and the head entry is "1", i.e., the next number of 0. This means that the entries have no available area.

Steps ST232 to ST234:

For releasing the head entry "1", the address table therein is written back to the flash memory module 39. The procedure therefor is similar to that in the first embodiment (steps ST8 and ST9 of FIG. 7), i.e., a physical page address PPA of any free area is acquired from the search table 43 for data writing thereto, and any corresponding portion in the table list 41b is updated, i.e., the location information corresponding to the table index "0x020" is updated. Thereafter, the head entry is accordingly released, and the value in the register 46b for the head entry is incremented to "2".

Expansion of Address Table

Step ST235:

In due course, the table index "0x050" is accessed in the table list 41b, and the corresponding physical page address PPA "0x030B0" is acquired.

Step ST236:

A page of the physical page address "0x030B0" is read from the flash memory module 39 and expanded to an area designated by the entry "1" of the RAM 40A. At this time, a new entry "1" is added, and the value in the register 47b for the tail entry is responsively incremented to "1". The table index corresponding to the entry "1" on the cache table 45b is updated to "0x050".

Step ST24:

From the cache data of the address table expanded on the internal RAM 40A, a physical page address PPA is acquired for the user data corresponding to the logical page address "0x05502" (step ST241). Based thereon, a page group carrying therein any desired user data is read from the flash memory module 39 to the page buffer 34 (ST242), thereby enabling data access via the page group. This procedure is the same as the one exemplified in the first embodiment (steps ST3 and ST4 of FIG. 7).

Step ST25:

Any desired portion of the sector is updated on the page buffer 34.

Step ST26:

The page group on the page buffer 34 is written back to the flash memory module 39. The procedure at this time is similar to that of the first embodiment (steps ST6 and ST7 of FIG. 7), i.e., after a physical page address PPA of any free area is acquired from the search table 43 (step ST261), and after the data is written thereto, any corresponding portion in the address table, i.e., a physical page address corresponding to the logical page address "0x05502", is updated to the address of a new writing destination (step ST262).

Note that, in the third embodiment, there is no need to search the table list 41b in an inverted order. This is because, at the time of entry release in step ST23, the table index of the releasing entry can be available directly from the cache table 45b.

The issue here is that, when the address table is cached with write-back caching, there is a possible risk that the address table will be lost. This is because, although every address table not on the cache is stored on the flash memory, the update details of the address table on the cache are not reflected to the flash memory soon enough.

To backup the address table, users often save a logical page address LPA to a backup area at the same time when saving user data. The logical page address LPA is the one serving as a corresponding index on the address table 42n. With such saving, even if the address table is corrupted due to an instantaneous power interruption, the address table can be created again by scanning every physical page address in the flash memory module to derive the correlation between physical page addresses and logical page addresses.

If the flash memory module is considerably increased in capacity with the larger number of pages, it means that an enormous amount of time will be consumed for scanning. As such, there is a demand not only for backup measures but also for easier measures.

In such a case, it is effective to use a nonvolatile RAM, e.g., a ferroelectric memory.

That is, if the RAM 40A is at least partially a nonvolatile RAM, and if the portion is used for caching the address table, every address table can be satisfactorily protected from an instantaneous power interruption. As described in the first embodiment, the table list 41 is also preferably stored inside the nonvolatile RAM. If the cache table 45 and the search table 43 are stored inside the nonvolatile RAM, the main information about the system can be perfectly protected and recovered momentarily even if an instantaneous power interruption occurs.

As such, caching of the address table in the second and third embodiments.

Next is a fourth embodiment of the invention, about a cache architecture in which the address table and the user data are mixed in together is described.

In the first embodiment, the user data and the address table are treated the same, mixed in together on the flash memory module for storage, and managed in a unified manner. With a concept similar thereto, the user data and the address table can be treated the same, mixed in together on the cache memory for storage, and managed also in a unified manner.

An example is described below.

The hardware configuration is similar to those of the second and third embodiments of FIG. 8.

Figure 14:
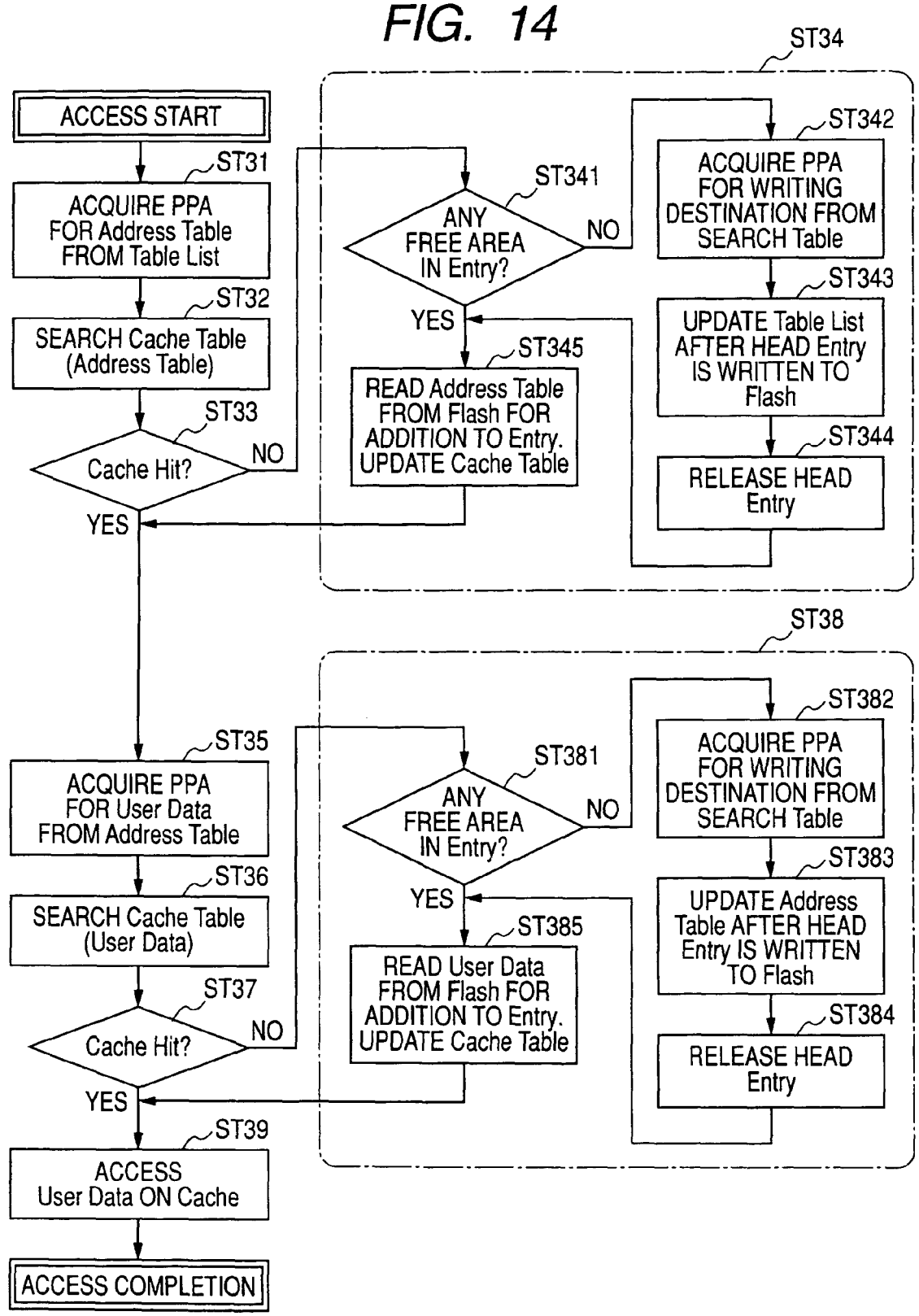
FIG. 14 is a flowchart of data access in the fourth embodiment.

FIGS. 13A to 13C are diagrams showing, respectively, an exemplary table list, address table, and cache table of the fourth embodiment. FIG. 14 is a flowchart of data access in the fourth embodiment.

On a cache table 45c, an address table and user data can be entered together both as entries. In this embodiment, a tag of the address table and that of the user data are each a physical page address PPA, and using the value thereof, access can be made exactly the same to the cache memory and the flash memory.

As such, the user data and the address table can be managed in a unified and simplified manner. What is more, irrespective of any difference observed therebetween, either of those showing the higher usage can be cached first so that the RAM can be effectively utilized.

Below, the procedure of making access to user data in the fourth embodiment is described with a correlation to the access flowchart of FIG. 14. In FIG. 14, steps ST31 to St34 are of acquiring an address table, and steps ST35 to ST38 are of acquiring user data. These sets of steps are similar to each other, and can be managed with the unified algorithm.

Step ST31:

When a sector address of "0x05502C" comes from the host system 50 together with an access command for user data, the control circuit 32 first receives the high-order address thereof and makes access to the internal RAM 40A. From a table list 41c resident in the RAM 40A, the control circuit 32 then acquires information about the location of the corresponding address table. Similarly to the first embodiment, the high-order 9 bits of the logical address are used, and a physical page address PPA "0x030B0" is acquired, indicating the location of an address table corresponding to the table index of "0x050".

Steps ST32 and ST33:

Using the physical page address PPA, the cache table 45c is searched to check whether there is any cache hit or not. The cache table 45c has eight entries, each corresponding to a predetermined storage area inside of the RAM 40A. The entries are managed by round-robin scheduling (first-in first-out), and any new entry is added to the last. The head entry and the tail entry are under the control of registers 46c and 47c, respectively.

In FIG. 14 example, the physical page address "0x030B0" matches none of the physical page address fields PPA of the entries. This means that the RAM 40A carries no desired address table, thereby resulting in a cache miss.

Step ST34:

When a cache miss occurs, any desired address table is read from the flash memory module 39 and is expanded on an area available in the internal RAM 40A. At this time, if required, entry release is performed. The series of procedures is almost the same as that in the second embodiment, i.e., step ST13 of FIG. 10. That is, with the following procedure, an area available in the RAM is reserved, and the address table is expanded thereon.

Step ST341:

The registers 46c and 47c in the cache table 45c show that the tail entry is "0", and the head entry is "1", i.e., the next number of 0. This means that the entries have no free area.

Steps ST342 to ST344:

For releasing the head entry "1", the storaged data therein is written back to the flash memory module 39. The procedure of releasing the address table is similar to that in the first embodiment (steps ST8 and ST9 of FIG. 7), i.e., a physical page address PPA of any free area is acquired from the search table 43 for data writing thereto, and any corresponding portion in the table list 41c is updated. On the other hand, the procedure of releasing the user data is the same as that in the first embodiment (steps ST6 and ST7 of FIG. 7). That is, a physical page address PPA of any free area is acquired from the search table 43 for data writing thereto, and any corresponding portion on the address table is updated. The entry is released in due course, and the value in the register 46c for the head entry is incremented to "2".

The issue here is that if the releasing entry is the user data, the corresponding address table also has to be on the cache memory. If not, an exception happens to the operation described above, and an operation of reading the address table from the flash memory module has to be separately executed. The measures thereagainst will be described later.

Expansion of Address Table

Step ST345:

A page of the physical page address "0x030B0" is read from the flash memory module 39 and expanded to an area designated by the entry "1" of the RAM 40A. At this time, a new entry "1" is added, and the value in the register 47c for the tail entry is responsively incremented to "1". The physical page address corresponding to the entry "1" on the cache table 45c is updated to "0x030B0".

Step ST35:

From the cache data of the address table 42c expanded on the internal RAM 40A, a physical page address "0x060B0" is acquired for the user data corresponding to the logical page address "0x05502".

Steps ST36 and ST37:

Based on the physical page address PPA, the cache table 45c is searched to check whether there is any cache hit or not. The procedure is the same as that for steps ST32 and ST33.

In the FIG. 14 example, the physical page address "0x060B0" matches none of the physical page address fields PPA of the entries. It means that the RAM 40A carries no desired address table, thereby resulting in a cache miss.

Step ST38:

When a cache miss occurs, any desired user data is read from the flash memory module 39 and is expanded on an area available in the internal RAM 40A. In this case, the free area is reserved in the RAM with the following procedure, and an address table is expanded thereon.

Release of Existing Entry

Steps ST381 to ST384: The head entry "2" is released in the manner exactly the same as that for steps ST341 to ST344 of step ST34, and the value in the register (48c) for the head entry is incremented to "3".

Expansion of User Data

Step ST385:

Any desired user data is added as an entry. That is, a page of the physical page address "0x060B0" is read from the flash memory module 39 and expanded to an area designated by the entry "2" of the RAM 40A. At this time, a new entry "2" is added, and the value in the register 47c for the tail entry is responsively incremented to "2". The physical page address corresponding to the entry "2" on the cache table 45c is updated to "0x060B0".

Step ST39:

Any desired user data is read out or updated on the cache memory 34.

For the cache architecture of the third embodiment of the invention, i.e., the address table and the user data are mixed in together, another embodiment is described below as a fifth embodiment.

The hardware configuration is similar to those of the second and third embodiments of FIG. 8.

Figure 16:
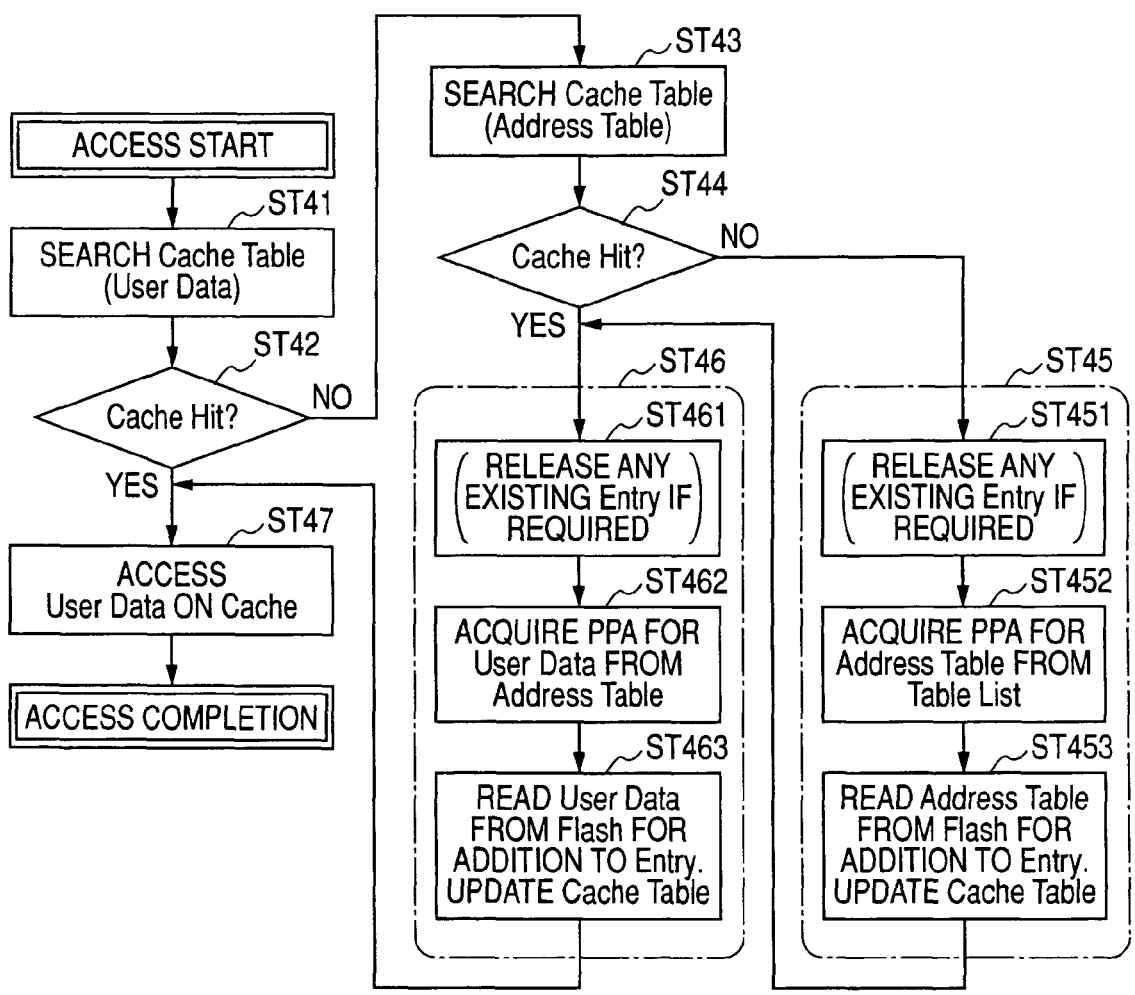
FIG. 16 is a flowchart of data access in the fifth embodiment.

FIGS. 15A to 15C are diagrams showing, respectively, an exemplary table list, an address table, and a cache table of the fifth embodiment. FIG. 16 is a flowchart of data access in the fifth embodiment.

On a cache table 45d, an address table and user data can be entered together both as entries. In this embodiment, a tag of the address table and that of the user data are each an address value derived by combining a logical page address LPA and a table index (T-Index).

That is, the storage device includes no such logical page that high-order 8 bits correspond to "0x40" in the 20-bit logical page address. Accordingly, the value is set as a flag for use to identify that the entry is an address table, and a table index is inserted to the low-order 12 bits. Using the value, the cache memory and the flash memory can be accessed exactly the same.

Below, the procedure of making access to user data in the fifth embodiment is described with a correlation to the access flowchart of FIG. 16. In FIG. 16, steps ST43 to ST45 are of acquiring an address table, and steps ST41, St42, and ST46 are of acquiring user data. These sets of steps are similar to each other and can be managed with the unified algorithm.

Steps ST41 and ST42:

When a sector address of "0x05502C" comes from the host system 50 together with an access command for user data, using its high-order address "0x05502", the cache table 45d is searched to check whether there is any cache hit or not. The cache table 45d has eight entries, each corresponding to a predetermined storage area inside of the RAM 40A. The entries are managed by round-robin scheduling (first-in first-out), and any new entry is added to the last. The head and the tail of the entry are under the control of registers 46d and 47d, respectively.

In the FIG. 15 example, the logical page address "0x05502" matches none of the table index fields of the entries. This means that the RAM 40A carries no desired user data, thereby resulting in a cache miss.

Steps ST43 and ST44:

From the high-order address of the sector address "0x05502C", a table index "0x050" is generated, and then a search tag "0x40050" is generated with a flag added. The cache table 45d is searched again to check whether there is any cache hit or not.

Note that, in the FIG. 15 example, the search tag "0x40050" matches none of the table index fields of the entries. This means that the RAM 40A carries no desired address table, thereby resulting in a cache miss.

Step ST45:

When a cache miss occurs, any desired address table is read from the flash memory module 39 and is expanded on an area available in the internal RAM 40A. In this case, if required, entry release is performed. The series of procedures is almost the same as that in the third embodiment, i.e., step ST23 of FIG. 12. That is, any free area is reserved in the RAM as, below, and an address table is expanded thereon.

Release of Existing Entry

Step ST451:

The head entry "1" is released in the manner exactly the same as that for step ST34 with the fourth embodiment, and the value in the register 46d for the head entry is incremented to "2".

Expansion of Address Table

Step ST452:

In due course, the table index "0x050" is accessed in the table list 41*d*, and the corresponding physical page address PPA "0x030B0" is acquired.

Step ST453:

A page of the physical page address "0x030B0" is read from the flash memory module 39 and expanded to an area designated by the entry "1" of the RAM 40A. At this time, a new entry "1" is added, and the value in the register 47*d* for the tail entry is incremented to "1". The table index corresponding to the entry "1" on the cache table 45*d* is updated to "0x40050".

Step ST46:

Any desired user data is read from the flash memory module 39 and is expanded on an area available in the internal RAM 40A. At this time, a free area is reserved in the RAM in the following manner, and an address table is expanded thereon.

Release of Existing Entry

Step ST461:

The head entry "2" is released in the manner exactly the same as that for step ST45, and the value in the register 46*d* for the head entry is incremented to "3".

Expansion of User Data

Step ST462:

From the cache data of the address table expanded on the internal RAM 40A, a physical page address "0x060B0" is acquired for the user data corresponding to the logical page address "0x05502".

Step ST463:

Any desired user data is added as an entry. That is, a page of the physical page address PPA "0x060B0" is read from the flash memory module 39 and expanded to an area designated by the entry "2" of the RAM 40A. At this time, a new entry "2" is added, and the value in the register 47*d* for the tail entry is responsively incremented to "2". The logical page address corresponding to the entry "2" on the cache table 45*d* is updated to "0x05502".

Step ST47:

Any desired user data is read out or updated on the cache memory 34.

The third embodiment as above is susceptible to improvements as below.

For entry addition to the cache memory, if an entry to be released to reserve a free area is user data, there is a need to operate the corresponding address table to write the entry back onto the flash memory module.

If no such table is found on the cache, the table has to be acquired from the flash memory again and expanded on the RAM. If the table is to be expanded inside of the same cache memory, the once-released entry is consumed in the table, whereby the procedure has to be started all the way from entry release. At worst, this may require a time-wasting operation of repeating the same loop several times.

To eliminate such a possibility of waste, it is preferable to guarantee that every user data on the cache memory has its corresponding address table also on the cache memory at the same time.

That is, in a manner to achieve the purpose, an operation is executed to change the release order of the address table, or a cache algorithm therefor is adopted.

As a specific example, when at least user data is added to the cache memory, a setting is made so that the corresponding table is to be released always after the user data.

That is, when any new data is entered to the cache memory, the address table is always accessed. With the above-described round-robin scheduling (first-in first-out), the previously-read address table is to be released before the new data, and this means that the address table is released before the user data.

In consideration thereof, when any user data is newly added, the cache table is so operated that the corresponding address table is to be released after the user data. If using stacking scheduling (first-in last-out) instead of round-robin scheduling, such an operation can be automatically implemented.

Figure 17:
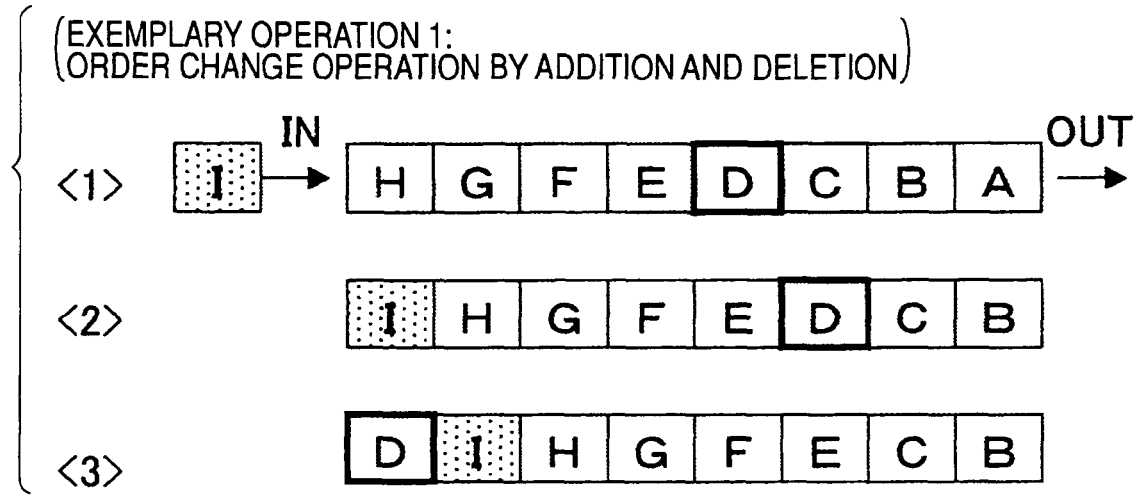
FIG. 17 is a conceptual diagram showing an exemplary order change operation for release priority in a cache memory by addition and deletion.
Figure 18:
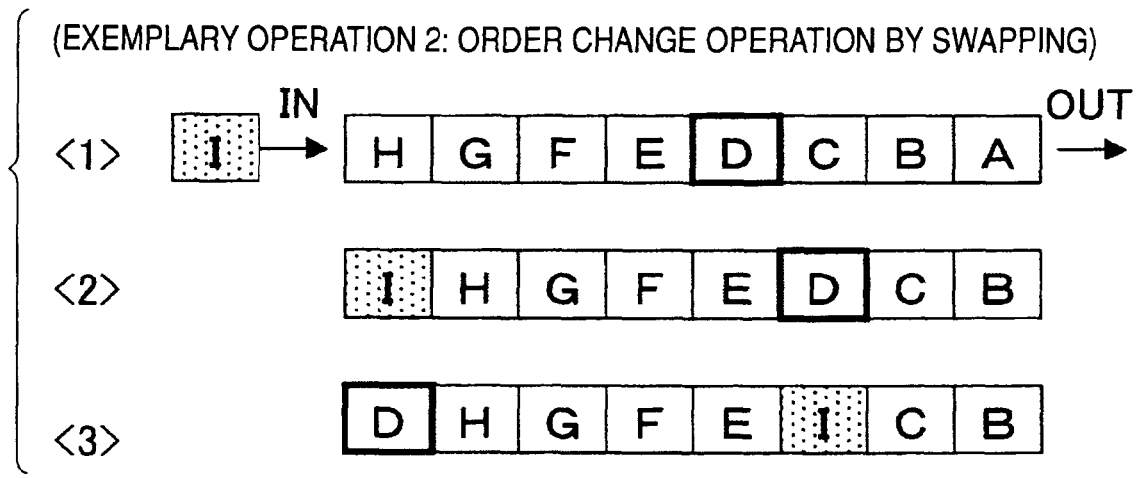
FIG. 18 is a conceptual diagram showing an exemplary order change operation for release priority in a cache memory by swapping.
Figure 19:
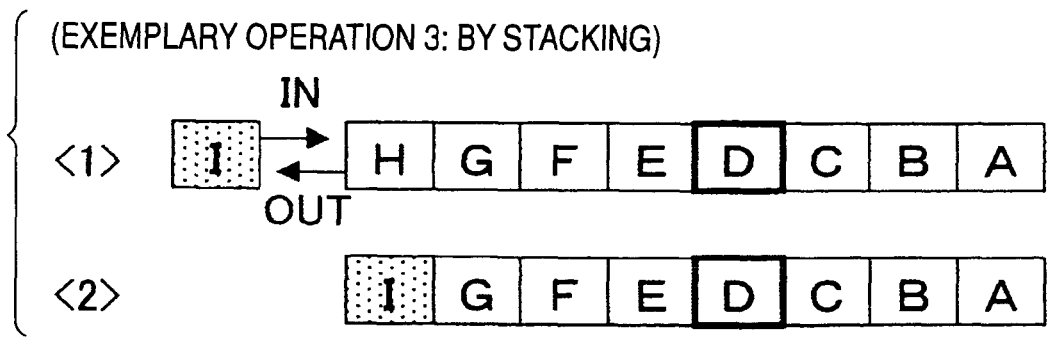
FIG. 19 is a conceptual diagram showing an exemplary order change operation for release priority in a cache memory by stacking.

FIGS. 17 to 19 are all a concept diagram showing an exemplary order change operation for release priority in a cache memory. FIG. 17 shows an exemplary order change operation by addition and deletion, FIG. 18 shows an exemplary order change operation by swapping, and FIG. 19 shows an exemplary order change operation by stacking.

In any of such three examples, when user data is newly added to a cache memory, a setting is made so that the corresponding table is always released after the user data.

Exemplary Operation 1: Order Change Operation by Addition and Deletion

1. Entries sequentially added, like ABCDEFGH, are released, basically, first-in first-out. Assumed here is that an entry I of user data is added. In a cache memory, the entry D of the address table corresponding to the entry I of user data already exists.

2. First of all, the entry D of the address table is accessed, and based on the information, the entry I of user data is read from a flash memory for addition to the cache memory. At this time, the entry A is released, and the entries B to H are moved to the right by an entry.

3. At this time, the entry D is moved to the tail of the string of entries. In response thereto, the entries E to I are moved to the right by an entry.

Such an order change operation for entry release can be implemented with ease if the entries are managed in a link list. If the entry A to be released is the table of the user data, i.e., entry I, the entry B may be released as an alternative to the entry A in the above process of 2, and the entries C to H may be moved to the right by an entry.

Exemplary Operation 2: Order Change Operation by Swapping 1 and 2. Same as the exemplary operation 1.

3. The order for entry release is swapped between the entries D and I.

Exemplary Operation 3: Stacking

1. Entries sequentially added like ABCDEFGH are released, basically, first-in last-out. That is, the entries are added by stacking. Assumed here is that an entry I of user data is added. In a cache memory, the entry D of address table corresponding to the entry I of user data already exists.

2. First of all, the entry D of the address table is accessed, and based on the information, the entry I of user data is read from a flash memory for addition to the cache memory. At this time, the entry H that is added immediately therebefore is released.

In any of these three examples, when user data is newly added to a cache memory, a setting is so made that the corresponding table is always released after the user data. The stacking naturally leading to such a setting generally has a low hit ratio, and it is thus considered more preferable if the order change operation is aggressively executed for entry release using the round-robin scheduling that can lead to a higher hit ratio.

Moreover, to increase the cache hit ratio, it is considered effective that any new entry is disposed at the tail of the string of entries in terms of the order of entry release. This may be applied not only when any new entry is added but also when any data is updated on the cache memory. When such a process is executed to the user data, it is considered preferable if the user data is accompanied by its corresponding table. If this is the case, for every user data on the cache memory, their corresponding address tables can be guaranteed as being on the cache memory at the same time.

The cache table is required to be guaranteed as such even if the user data is not stored together with the address table but in any other cache area. As in this embodiment, however, such a guarantee is easily issued if the user data is stored in the same cache memory as an entry. That is, in this embodiment, as to the user data and the address table, their entries can be freely added, deleted, or swapped so that such a solid guarantee can be issued as above with ease.

As to the placement of a cache memory with respect to a flash memory, many proposals have been proposed with an aim for caching the user data. The use of the cache memory is described in JP-A-2005-216775, JP-A-2006-349286, and others. The inventors of the invention have proposed an improvement of algorithm for a cache memory for use with the user data in JP-A-2005-171141, JP-A-2005-220940.

With the invention adopted, an address table can be treated the same as user data, and the address table and the user data can be managed in a unified manner. If a table list and a cache table are used together, the invention can be applicable with ease for cache management no matter how complicated it is.

As such, in the second to fifth embodiments, various types of cache algorithms as above can be applied in a similar manner. For example, a page group being a unit for batch writing of the flash memory module may be further segmented into 1/N (where N is an integer of 2 or larger), and similarly-segmented address tables may be stored therein for use as units for cache entry.

In the above embodiments, a RAM is provided inside the file storage device, and an address table is expanded thereon for management using an internally-equipped control circuit. The file storage device of a mobile type, e.g., a memory card, is compatible with various types of hosts. It is thus considered effective to execute such a conversion process in the storage device.

If with a computer system including a built-in storage, the host CPU often expands an address table in a system memory for management thereof using drive software or others. With such a case, the concept of the invention is applicable in exactly the same manner.

That is, the host CPU deals with the address table exactly the same as the user data and stores these together in a flash memory device in a unified manner. In the system memory, information indicating the locations of the address tables in the flash memory is resident in the form of a table list.

In response to a command coming from an OS or an application, the host CPU makes access to the flash memory device in the following procedure.

1. A table list is first referred to, and location information on a flash memory device is acquired for an address table corresponding to a logical address requested by the OS or the application.

2. Next, the location information is used as a basis to make access to a flash memory, and an address table is read out for expansion on a system memory.

3. The address table is then referred to for acquiring the location information on the flash memory device for user data corresponding to the logical address requested by the OS or the application.

4. Lastly, based on the location information, the flash memory is accessed for reading of the user data or updating the user data if required.

The specific operation for the address table or the table list can be performed in a manner exactly the same as the first embodiment.

The system memory can be used as a cache memory for the address table and can be provided with a plurality of entries. Entries of user data can be mixed in together with other entries in the system memory. In such a case, the cache table may be operated exactly the same as in the second to fifth embodiments.

Note here that managing the flash memory device needs not only the address table as above but also many other management tables.

The possible tables for management of the flash memory device include the search table 43 of FIG. 6, a table including replacement information for use in replacing any defective block (not shown) with a satisfactory spare block, and others. As the storage is increased in capacity, these tables are also increased in size, and they will squeeze the area of the RAM.

As in the embodiments described above, the address table is segmented into small tables, and the segmentation results are scattered throughout the flash memory and stored together with the user data so that unified management is achieved for the address table and the user data.

The issue here is that the management data is not always handled like the user data.

Considered here is a case where the search table 43 is put under management exactly like the user data after table segmentation. In this case, if the search table 43 is to be partially updated for writing to the flash memory, there is a need to make the current area of the search table 43 on the flash memory invalid. For this purpose, a page flag (page disabled) for updating a portion of the search table 43 has to be updated again. That is, if any portion of the search table 43 is to be updated, there need to be an update of some other portion of the search table. Such an updating operation may be endlessly repeated.

As such, the management data cannot be put under management together with the user data. However, if the basic concept of the invention is modified and applied as below, it becomes possible to derive a satisfactory access capability for most of the management data while preventing intensive rewriting.

That is, for storage of the management data, any specific erase block is provided, and such erase blocks are dynamically reserved on the flash memory similarly to the user data. In this case, for such data storage, the area on the flash memory which is the same as that for the user data is used. That is, in this area, blocks each including the management data are mixed in together with blocks each including the user data.

As a sixth embodiment, below, area reservation in a case where the blocks each including the management data are mixed in together with the blocks each including the user data is described.

FIGS. 20A to 20D are diagrams each showing a concept of area reservation in the sixth embodiment.

In FIGS. 20A to 20D, a reference character z1 denotes a flash memory device, z2 denotes user data, z3 denotes a writing pointer, and z4 denotes a local pointer.

Step ST51

Figure 20A:
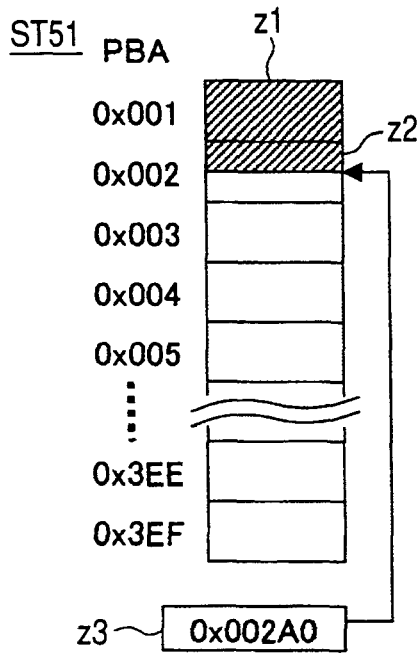
FIGS. 20A to 20D are all diagrams showing a concept of area reservation in a sixth embodiment.

As shown in FIG. 20A, in an erase block in the flash memory device z1, i.e., areas of addresses "0x001" to "0x3EF", the user data and the management data are stored. In this example, the writing pointer z3 is sequentially incremented, and in response thereto, the user data z2 is written on a page basis. The high-order of the writing pointer z3, i.e., "0x002", is a block address, and the low-order thereof, i.e., "0xA0", is a page address.

Step ST52

Figure 20B:
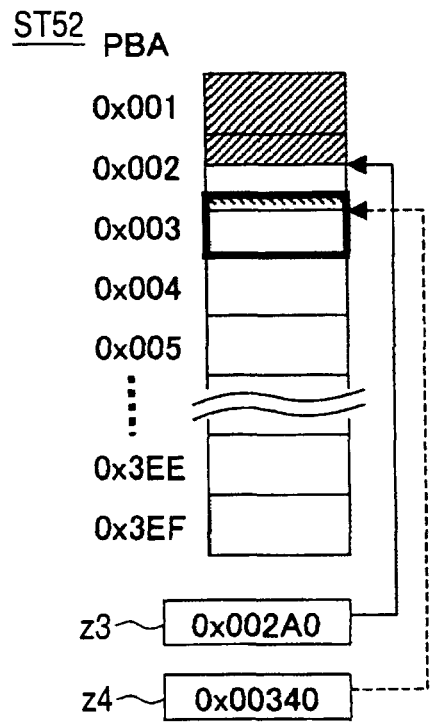

Assumed here is that the management data is written in the above state. As shown in FIG. 20B, a search is made to find an available block "0x003" next to the block "0x002" including the writing pointer z3, and an area is reserved for storage of the management data. At the head of the block, the local pointer z4 is set for writing the management data, and as the pointer is incremented, the management data is sequentially written inside of the block "0x003" on a page basis.

Step ST53

Figure 20C:
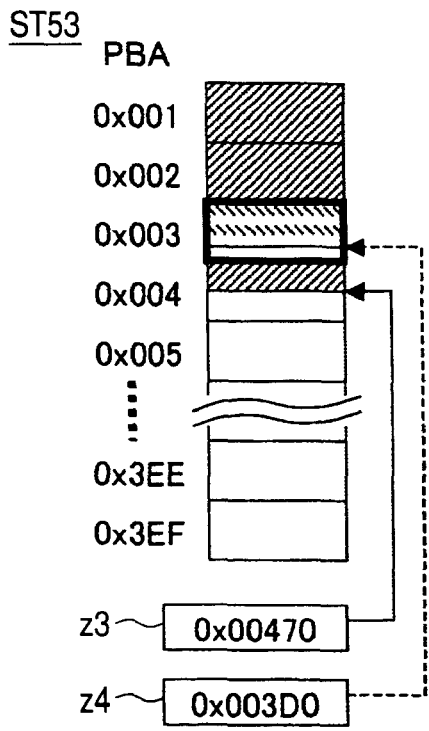

As shown in FIG. 20C, when the block "0x002" is filled after the user data is written, the writing pointer z3 is moved to the head of the next available block "0x004", and an area is reserved for storage of the user data. As the pointer z3 is incremented, the writing of the user data is continued.

Step ST54

Figure 20D:
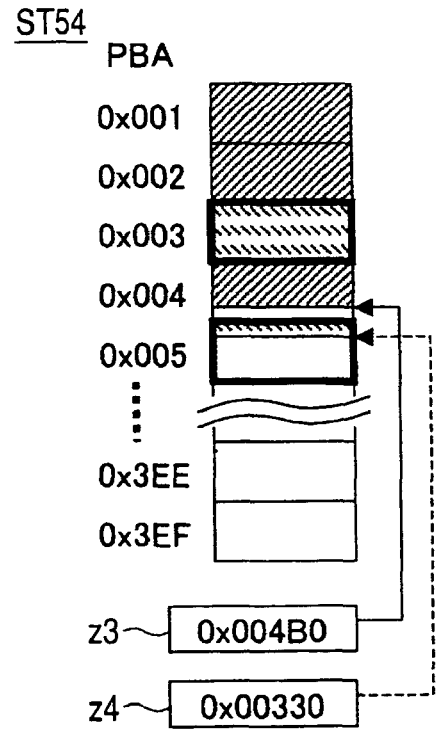

As shown in FIG. 20D, when the block "0x003" is filled after the management data is written, a search is made to find an available block "0x005" next to the block "0x004" including the writing pointer z3, and an area is reserved for storage of the management data. The local pointer z4 is moved to the head of the block, and as the pointer is incremented, the management data is sequentially written inside of the block "0x005" on a page basis.

As such, inside of the common areas "0x001" to "0x3EF" in the flash memory z1, areas for storage of the user data and the management data are dynamically reserved on a block basis. The writing pointer z3 moves from one block to another, whichever is available in the areas, and the user data is written in accordance therewith. The storage areas for the management data are also reserved dynamically on a block basis in the vicinity of the pointer as required.

In this manner, it becomes possible to prevent intensive rewriting onto the storage area for the management data while managing the user data and the management data separately.

Such a technique is applicable also to various other management data including the storage of an address conversion table as above. Note that, with this technique, the management data varying in type may be separately allocated with a local pointer and a block and may be separately managed.

Herein, the writing pointer z3 of the user data is used as a common reference for area reservation. This is because the user data has the highest writing frequency, and the pointer seems to move fastest. If required, another reference pointer may be provided separately. That is, either the writing pointer z3 or the local pointer z4, whichever is pointing to the block on the front side, may be saved for use as a reference pointer, and in any area available in the front of the pointer, any storage area may be reserved for the user data or the management data.

Here, the first and sixth embodiments are compared in terms of technique, and they are the same in the respect that the areas for storing the management data (including an address conversion table) and the user data are each dynamically reserved in the common area of the flash memory and exist together in no particular order. In the first embodiment, however, the area is reserved by a page unit that is the same as the writing unit. On the other hand, in the sixth embodiment, the storage area is reserved on an erase block basis. The former has the advantage of managing the units in a unified manner, and the latter has the advantage of handling a wide range of management data by managing the units each separately. The latter also has the advantage of reducing the capacity of the RAM for use in managing the location of the table.

Described next is an exemplary specific case where the sixth embodiment is applied for storage of an address conversion table similarly to the first embodiment. The hardware configuration is similar to that of the first embodiment of FIG. 5. Similarly to the first embodiment, the page-basis virtual address management is adopted. The tables vary in configuration depending on the difference of the management techniques.

Figure 22:
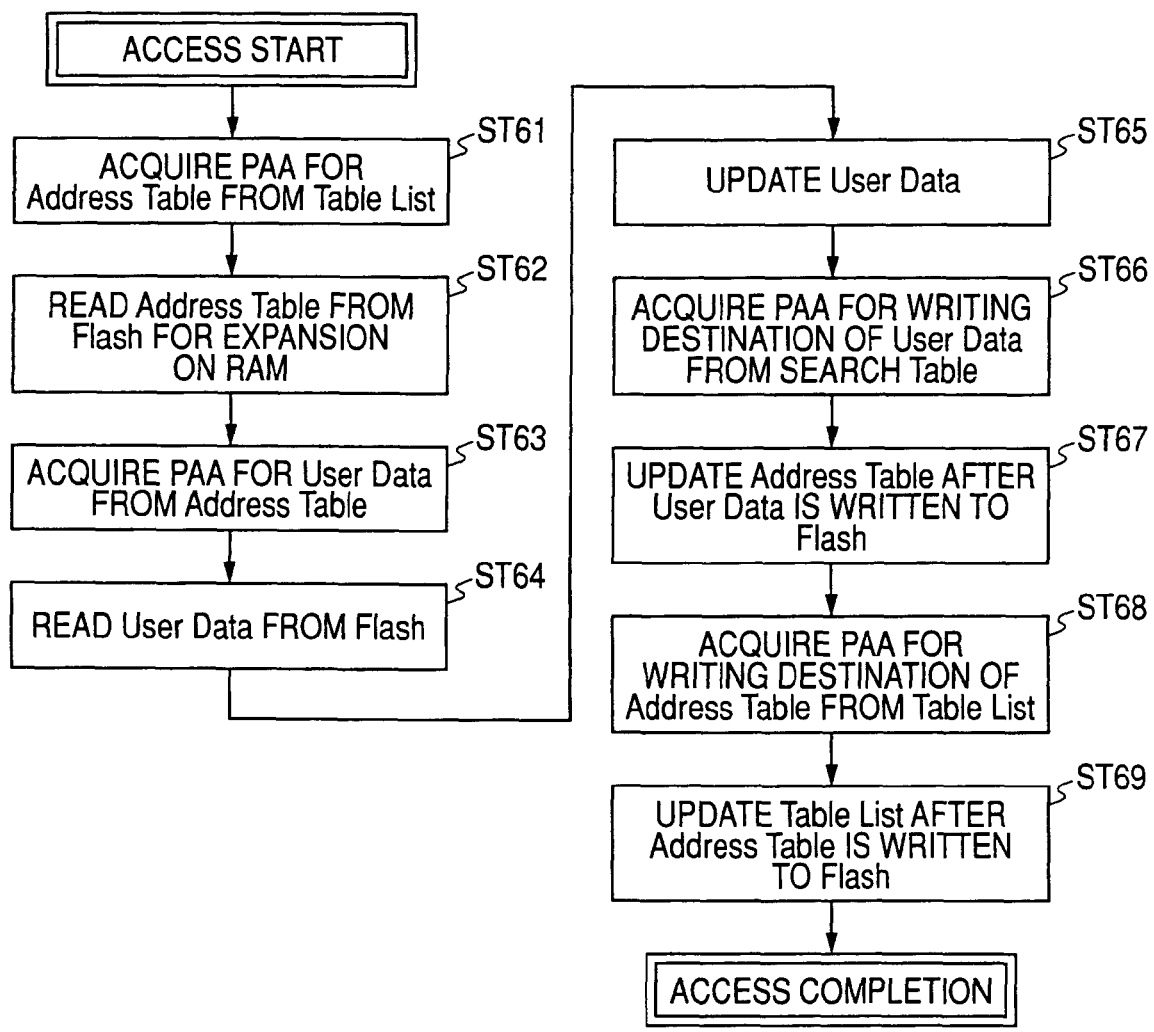
FIG. 22 is a flowchart of data access using the table list, the address table, and the search table of the sixth embodiment.

FIGS. 21A to 21C are diagrams showing, respectively, exemplary configurations of a table list 41e, an address table 42e, and a search table 43e. FIG. 22 is a flowchart of data access using the table list 41e, the address table 42e, and the search table 43e.

The flash memory module 39 in the file storage device 30 is specifically accessed as below in accordance with the flowchart of FIG. 22.

Step ST61:

When a sector address of "0x05502C" comes from the host system 50 together with an access command for user data, the control circuit 32 first receives the high-order address thereof and makes access to the internal RAM 40. From a table list 41e resident in the RAM 40, the control circuit 32 then acquires information about the location of the corresponding address table 42e.

The table index (T-Index) provided to the table list 41e is segmented for every logical page address area of 2 k pages. In this example, used as the index are the high-order bits up to "0000_0101_0" in those of "0000_0101_0101" (binary expression of "0x055") of the sector address.

In the embodiment, in an area for storing an address table, any specific block is dynamically assigned for every 32 small tables (corresponding to 32 indexes). That is, the address table is segmented into 128 small tables, which form groups each having 32 tables, and they are each stored in four erase blocks. The storage blocks are dynamically reserved with areas as specific blocks for storing the address table and include each separate local pointer.

The high-order-4-bit "0000" of the index "0000_0101_0" is allocated with the same block address of "0x030". The low-order-5-bit "0101_0" is allocated with an offset value (POFF) "0xB0" of the page in the block. That is, a physical page address PPA "0x030B0" indicating the location of the address table corresponding to the index of "0x050" is acquired. The local pointer for this specific block is stored in a register 48e, and the value thereof is "0xC0". When an area is reserved for every block as such, the portion of the block address can be shared among a plurality of pages. As such, the table list 41e resident in the RAM can be reduced in capacity compared with the case with area reservation for every page.

Step ST62:

Using the physical page address, the flash memory module 39 is accessed, and a page group including an address table is read for the page buffer 34. The page group is expanded on the RAM 40, and the address table 42e is created.

The address table 42e stores information of 4 bytes (32 bits) corresponding to each of the logical page addresses LPA, and 20 bits thereof are a physical page address PPA on the flash memory module. The remaining bits carry therein historical information including a time stamp at the time of data update, the update frequency, and others.

As described above, one address table covers a logical page address of 2 k pages, and the total capacity thereof is 8 k bytes (4 bytes×2 k), corresponding to the capacity of a page that is a unit for batch writing.

Step ST63:

From the logical address "0x05502C" of the sector again, the address table 42e is referred to with an address of the logical page address LPA "0x05502" so that the physical page address PPA "0x060B0" is acquired for the user data that is an access target.

Step ST64:

Using the physical page address PPA, the flash memory module 39 is accessed again, and a page group including the user data is read for the page buffer 34.

Thereafter, any portion corresponding to the sector address "0xC" is selectively forwarded from the host buffer 34 to the side of the host system 50, and this is the end of the reading operation.

The data is updated as below. Assumed here is a case where the same sector of "0x05502C" is to be updated. In this case, there is a need to read any desired page to the page buffer 34, and the procedure is the same as that for steps ST61 to ST64.

Steps ST61 to ST64:

Similarly to data reading, any desired data read from the flash memory module 39 is stored in the page buffer 34.

Step S65:

On the page buffer 34, any desired portion of the sector is updated.

Step ST66:

As a writing destination in the flash memory module 39 for the updated user data, the search table 43e resident in the RAM 40 is searched for a physical page address PPA for any appropriate page area. For brevity, the physical page address is assumed to be configured by a high-order-12-bit physical block address (PBA) and a low-order-8-bit page offset. In this case, the erase blocks are each configured by 256 pages ($2^8$).

The search table 43e stores therein a flag (page disabled) for every block, indicating whether the pages inside are valid or invalid. When a page is made invalid, the corresponding flag is set to "1". The "Used Flag" indicates whether the blocks are currently in use or available after having data erased.

The data writing is performed sequentially from the head page of any data-erased block. The physical address of the previously-written page is stored in a register 44e, and the page number derived by incrementing the number of previous page is selected as a writing destination. When the selecting number reaches the tail of the block, the blocks onwards are scanned to find their "Used Flag", and the next not-used block is detected so that the head page thereof is selected.

The current value of the register 44e is "0x0AA01", and as a writing destination for the user data, the control circuit 32 first selects a physical page address "0x0AA02" that is an increment result of the current value.

Step ST67:

Using the physical page address PPA, the flash memory module 39 is accessed, and the user data in the page buffer 34 is written in batch to the flash memory module. When data writing is completed, the address table 42 is updated, and the physical page address PPA corresponding to the logical page address LPA "0x05502" is updated to "0x0AA02". The page area corresponding to the previous physical page address "0x060B0" is made invalid, and the corresponding flag in the search table 43e is changed to "1".

Step ST68:

The update details of the address table 42e are required to be reflected also onto the flash memory module. At this time, unlike the first embodiment, in the sixth embodiment, a writing destination of the address table onto the flash memory module is a free area of the block "0x030" that is the same as before the data update.

Although the blocks specifically provided for storage of the address table can each store 256 pages, each of the blocks is actually allocated only with an address table of 32 indexes. Therefore, normally, the blocks all have substantially the same amount of available area. To such an available area, the updated data is written as the local pointer stored in the register (48e) is incremented. In this example, the local pointer is incremented by 1, and responsively, a physical page address "0x030C1" is selected.

When the local pointer comes at the tail of the block "0x030" as a result of repeated data updating a new block is reserved as described below for data transfer thereto.

First of all, from a block "0x0AA" indicated by the register 44e, a "Used Flag" is scanned so that the next not-used block is detected. In the new block, any new writing area is reserved for the writing of an address table, and the local pointer points the head thereof. The "Used Flag" of the new block is updated to "1". The table list 41e is then referred to for its information, and the small tables stored in the original block "0x030" is sequentially copied to the new block as the local pointer is incremented. After such copying is completed, the fields of the table list 41e are updated, and the original block is erased. The "Used Flag" of the original block after such data erasing is changed to "0". In this manner, the block that is a wiring destination is moved.

Lastly, the local pointer is incremented by 1 again, and the next available page area of the newly-reserved block is selected as a writing destination for the updated small address table.

Step ST69:

Using the physical page address, the flash memory module 39 is accessed again. The address table 42e is first copied and transferred from the RAM 40 to the page buffer 34, and then it is written, in batch, to the flash memory module as a page group.

Once the writing is completed, the table list 41e is updated, and the page offset POFF corresponding to the table index (T-Index) "0x050" is updated to "0xC1".

Note here that, unlike the first embodiment, there is no need to update the page flag (page disabled) of the block table 43e.

Under the writing control as such, used for access to the address table 42e on the flash memory are only the table list 41e and any Used Flag in the search table 43e.

Accordingly, a portion of a page flag (page disabled) of the search table (43e) whose capacity is the second largest to the address table may be separated from the Used Flag, and if necessary, the page flag may be segmented in a manner similar to the above for storage into the flash memory device.

With this being the case, the Used Flag will be shared by the user data and the address table. Herein, as a table to indicate the storage location of the page flag (page disabled), there needs to be provided additionally a list corresponding to the table list (41e).

The segmentation unit for storing the management data to the flash memory device is preferably limited to a size equal to or smaller than the page area that is a unit for batch access of the flash memory device. This aim is to read or store a unit at one access.

In the first embodiment, a cache memory is provided for use for the address table, and the concept is developed as in the first embodiment. Also, in the sixth embodiment, in a manner exactly the same as in the first embodiment, a cache memory can be provided on a reading-destination RAM for use for various management data stored in a flash memory device. In this case, entries preferably serve as a unit for table segmentation, and the cache memory is preferably provided with a plurality of entries.

Described below is a seventh embodiment in which area reservation is made similarly on a block basis, and a table list resident in the RAM is reduced in size to a further extent. The hardware configuration is similar to those in the first and sixth embodiments of FIG. 5.

FIG. 23A to 23C are diagrams showing, respectively, exemplary configurations of a table list 41f, an address table 42f, and a search table 43f of the seventh embodiment.

With the table list 41f of the seventh embodiment, no page offset is provided anymore for each of the small address tables. That is, for every group including 32 small address tables, only an address of a storage-destination block and a local pointer indicating the writing destination in the block are provided. When the block address consumes 2 bytes, and the local pointer consumes 1 byte, the capacity of the RAM needed for storing the table list 41f is only 12 bytes with respect to the storage in its entirety, i.e., 128 small address tables.

Figure 24:
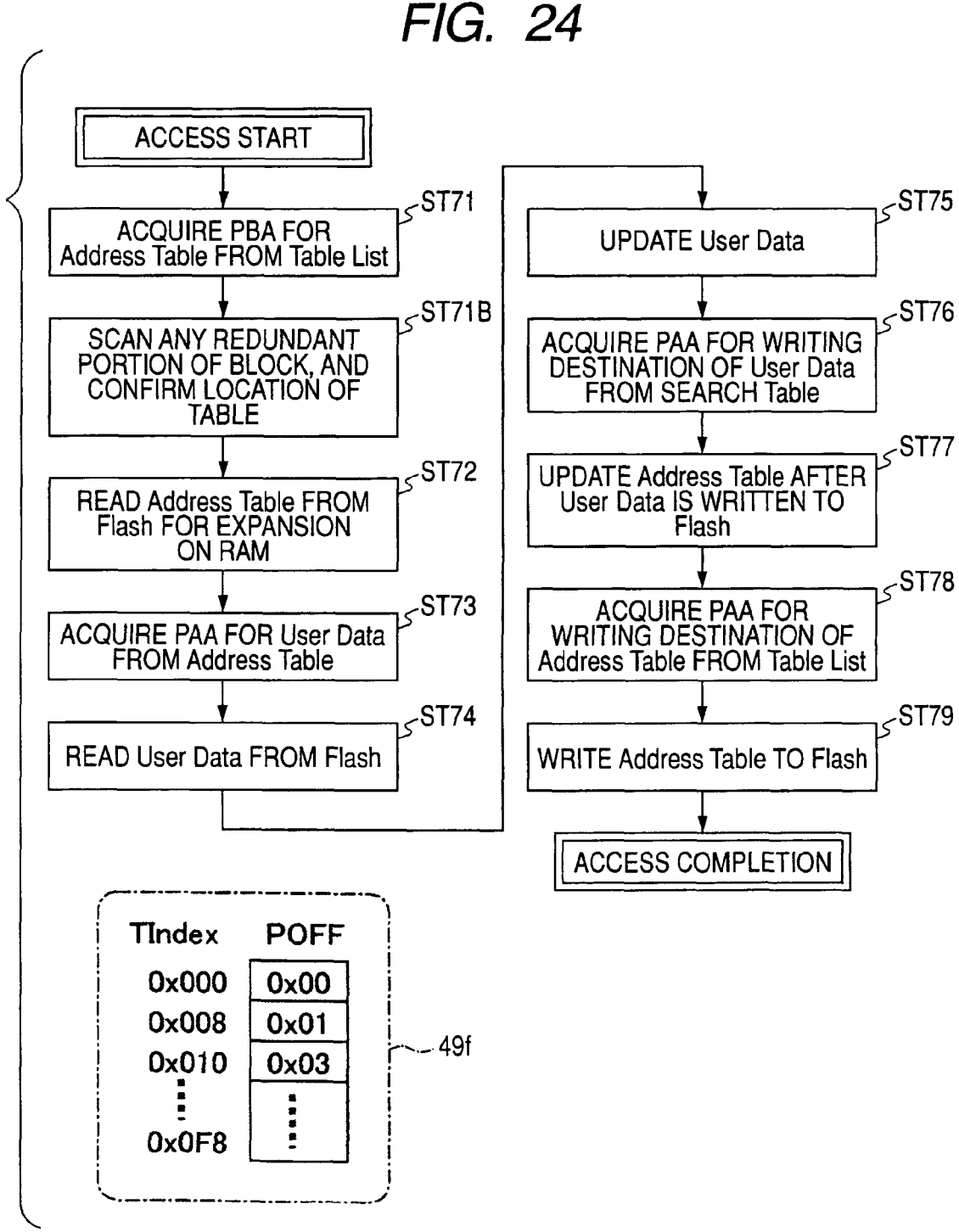
FIG. 24 is a flowchart of data access using the table list, the address table, and the search table in the seventh embodiment.

FIG. 24 is a flowchart of data access using the table list 41f, the address table 42f, and the search table 43f of the seventh embodiment.

The flash memory module 39 in the file storage device 30 is specifically accessed as described below in accordance with the flowchart of FIG. 24.

Step ST71:
When a sector address of "0x05502C" comes from the host system 50 together with an access command for user data, the control circuit 32 first receives the high-order address thereof and makes access to the internal RAM 40. From the table list 41f resident in the RAM 40, the control circuit 32 then acquires a block address including the corresponding address table 42f.

The table index (T-Index) corresponding to each of the small address tables is segmented for every logical page address area of 2 k pages. In this example, the high-order bits up to "0000_0101_0" in those of "0000_0101_0101" (binary expression of "0x055") of the sector address are used as the index.

In the embodiment, any specific block is dynamically allocated for every 32 small tables (corresponding to 32 indexes). That is, the address table is segmented into 128 small tables in its entirety, which forms groups each having 32 tables, and are each stored in four erase blocks. The storage blocks are dynamically reserved with areas as specific blocks for use in storing the address table, and they each include separate local pointer.

The high-order-4-bit "0000" of the index "0000_0101_0" is allocated with the same block address of "0x030". Unlike the sixth embodiment, at this point, an offset value (POFF) storing the small tables in the block is unknown. The local pointer for this specific block is stored in a register 48f, and the value thereof is "0xC0".

Step ST71B:
The redundant area for every page is scanned, i.e., from the head page "0x00" of the block "0x030" to the page including the local pointer "0xC0", and a search is made to find a page including any desired small table. The redundant area of each of the pages has a table index for the small tables in storage. The page whose value matches the table index "0000_0101_0" of any desired small table, which page is located at the lowest address, i.e., the value most recently written, is the page being looked for. As such, a physical page address PPA "0x030B0" is acquired for the desired small table, for example.

Step ST72:
The desired small address table 42f is read into the RAM. This process is similar to that of step ST62 in the sixth embodiment.

Step ST73:
A physical page address PPA "0x060B0" is acquired for the user data from the address table 42f. This process is similar to that of step ST63 in the sixth embodiment.

Step ST74:
The user data is read from the flash memory to the page buffer. This process is similar to that of step ST64 in the sixth embodiment.

Step ST75:
Any portion of the sector is updated on the page buffer 34. This process is similar to that of step ST65 in the sixth embodiment.

Step ST76:
From the search table 43f and the pointer 46f, a writing address is acquired for the updated data. Herein, the pointer 46f is incremented, and the address "0x0AA02" is selected as a physical page address as a writing destination. This process is similar to that of step ST66 in the sixth embodiment.

Step ST77:
The user data is written to the flash memory. The physical page address PPA corresponding to the logical page address LPA "0x05502" in the address table 42f is updated to "0x0AA02". The page area corresponding to the previous physical page address "0x060B0" is made invalid, and the flag of the corresponding page in the search table 43f is changed to "1". This process is similar to that of step ST67 in the sixth embodiment.

Step ST78:
The writing destination of the updated address table 42f is selected from any available area of the block "0x030" the same as before the data update. That is, the local pointer stored in the register 48f is incremented by 1, and a physical page address "0x030C1" is selected.

This process is similar to that of step ST68 in the sixth embodiment.

When the local pointer comes at the tail of the block "0x030" as a result of repeated data update, a new block is reserved as described below for data transfer thereto.

First of all, from a block "0x0AA" indicated by the register 44f, a "Used Flag" is scanned so that the next not-used block is detected. In the new block, any new writing area is reserved for writing of an address table, and the local pointer points the head thereof. The "Used Flag" of the new block is updated to "1".

For moving the data, the procedure to be executed is different from that in the sixth embodiment.

First of all, the redundant area of the previous block "0x030" is completely scanned for each of the pages, and a table 49f corresponding to the logical page address and the page offset is generated for temporary use on the RAM.

The information about the table is referred to, and the small tables stored in the original block "0x030" are sequentially copied to the new block as the local pointer is incremented. After such copying is completed, the table 49f is released. The physical block address field "0x030" of the table list 41f is updated to the address of the new block, and the original block is erased. The "Used Flag" of the original block after erasing is changed to "0". In this manner, the block that is a writing destination is moved.

Lastly, the local pointer is incremented by 1 again, and the next available page area of the newly-reserved block is selected as a writing destination for the updated small address table.

Step ST79:

The address table 42f is written to the flash memory module. Unlike the sixth embodiment, there is no need to update and write the page offset thereof to the table list 41f.

As described above, according to the embodiments of the invention, the address tables are scattered throughout the flash memory and stored. The address tables are dealt with the same as the user data, and thus they can be managed in a unified manner. As such, the address tables can be extracted swiftly with flexibility, are easy for data updating, and can be prevented from being intensively rewritten to only one specific erase block. What is better, there is no need to newly include any complicated function.

With such a computer system utilizing an address table that is huge in size, the data on the flash memory can be accessed with efficiency, and storing the address table requires no large RAM area. Accordingly, the resulting computer system can be high in speed, flexible, inexpensive, and highly reliable.

Moreover, for the management data other than the address table, an area for storage can be dynamically reserved into the flash memory area shared by the user data. As such, no rewriting is intensively made to any specific erase block.

It should be understood by those skilled in the art that various modifications, combinations, sub-combinations and alterations may occur depending on design requirements and other factors insofar as they are within the scope of the appended claims or the equivalents thereof.

What is claimed is:

1. A storage device, comprising:
    an address table;
    a control circuit comprising a RAM (Random Access Memory);
    a cache memory reserved in the RAM; and
    a flash memory device that is a storage medium for user data,
    wherein the control circuit manages access for the flash memory device,
    the control circuit makes access to the user data on the flash memory device via the address table,
    in the address table, with an index of an address value generated from an initial logical address, location information of a page group is acquired for the user data on the flash memory device corresponding to the index, and
    the address table is segmented in its entirety into a plurality of small address tables for every area of the index, and
    the small address tables that are segmentation results are stored in the flash memory device, read as required when the user data is accessed, and subsequent to storing and reading the user data is expanded on the cache memory;
    a second address table, wherein
    in the second address table, location information of a page is acquired for any of the small address tables on the flash memory device corresponding to the initial logical address, and
    the control circuit manages access for the user data on the flash memory device,
    based on the initial logical address, via referring to the second address table and the location information of the page acquired from the corresponding small address table,
    the location information of the page in the second address table is used to check whether the user data that was subsequently expanded on the cache memory includes a user-desired data,
    when a cache miss occurs, the user-desired data is read from the flash memory and expanded on the cache memory while the second address table is updated accordingly, and
    the control circuit refers to the updated second address table, based on the initial logical address, to acquire page location information about the user-desired data, and based on the location information of the page, the user-desired data on the flash memory device is accessed.

2. The storage device according to claim 1, wherein the cache memory is accessed by write-back caching.

3. The storage device according to claim 1, wherein the cache memory stores therein the small address tables for use as the entries.

4. The storage device according to claim 1, wherein the small address tables are stored in the flash memory device for every page that is a unit for batch reading/writing in the flash memory device.

* * * * *